(12) United States Patent
Lee et al.

(10) Patent No.: US 8,798,684 B2
(45) Date of Patent: Aug. 5, 2014

(54) MOBILE TERMINAL AND CONTROLLING METHOD THEREOF

(75) Inventors: Young Hoon Lee, Guri-si (KR); Han Sihn Chung, Seoul (KR); Jung Hye Shin, Yongin-si (KR); Ju Ho Ha, Seoul (KR); Jae Sek Seong, Ansan-si (KR); Min Soo Park, Ansan-si (KR); Yee Rang Yun, Seoul (KR)

(73) Assignee: LG Electronics Inc., Seoul (KR)

( * ) Notice: Subject to any disclaimer, the term of this patent is extended or adjusted under 35 U.S.C. 154(b) by 307 days.

(21) Appl. No.: 13/014,197

(22) Filed: Jan. 26, 2011

(65) Prior Publication Data
US 2011/0256907 A1 Oct. 20, 2011

(30) Foreign Application Priority Data

Apr. 19, 2010 (KR) .................. 10-2010-0035754
Jun. 14, 2010 (KR) .................. 10-2010-0055860

(51) Int. Cl.
*H04B 1/38* (2006.01)
(52) U.S. Cl.
USPC .............. 455/566; 455/556.1; 455/550.1; 455/575.1; 455/418
(58) Field of Classification Search
USPC ........................................ 455/566; 719/314
See application file for complete search history.

(56) References Cited

U.S. PATENT DOCUMENTS

| 2004/0137884 | A1 | 7/2004 | Engstrom et al. | |
|---|---|---|---|---|
| 2006/0063539 | A1 | 3/2006 | Beyer, Jr. | |
| 2008/0176602 | A1* | 7/2008 | Kim | 455/564 |
| 2009/0054107 | A1 | 2/2009 | Feland, III et al. | |
| 2009/0089798 | A1* | 4/2009 | Anderson et al. | 719/314 |

FOREIGN PATENT DOCUMENTS

WO WO 2006/117438 A1 11/2006

* cited by examiner

*Primary Examiner* — Kashif Siddiqui
*Assistant Examiner* — Sayed T Zewari
(74) *Attorney, Agent, or Firm* — Birch, Stewart, Kolasch & Birch, LLP

(57) ABSTRACT

A mobile terminal and controlling method thereof are disclosed, by which group communications of various types with a conversation group can be performed in various ways can be performed in a manner of forming the group of conversation with at least two counterpart terminals using an image including at least two character pictures. The method includes displaying an image including at least two character pictures on a display unit of the mobile terminal, if the at least two character pictures in the image are selected, searching a memory of the mobile terminal for contact information respectively related to the selected character pictures, forming a conversation group with the searched contact information, and performing group communication with the conversation group.

20 Claims, 35 Drawing Sheets

FIG. 6
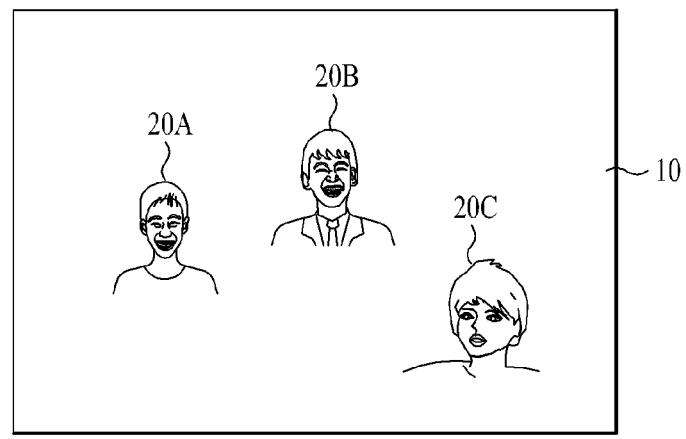
(a)
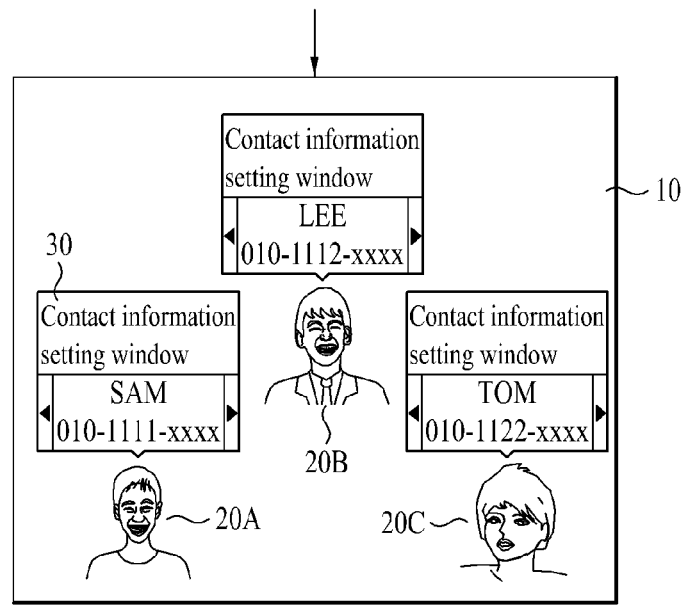
(b)
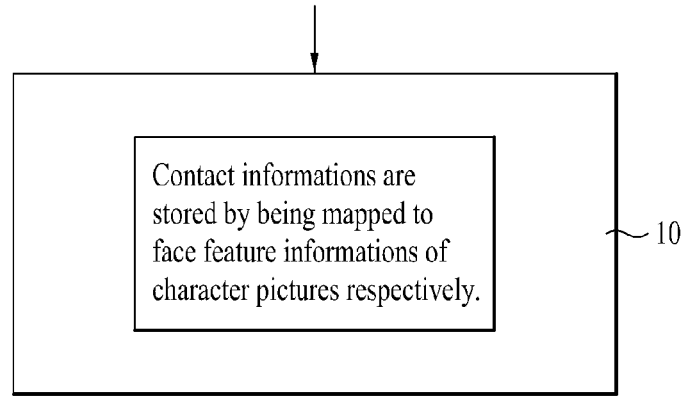
(c)

FIG. 13
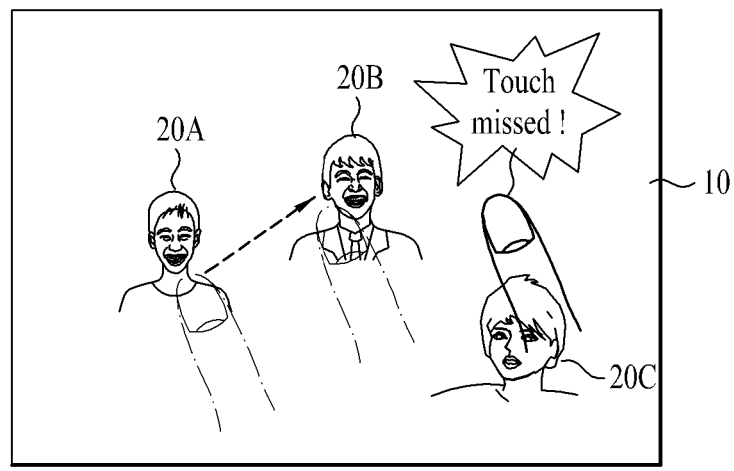
(a)
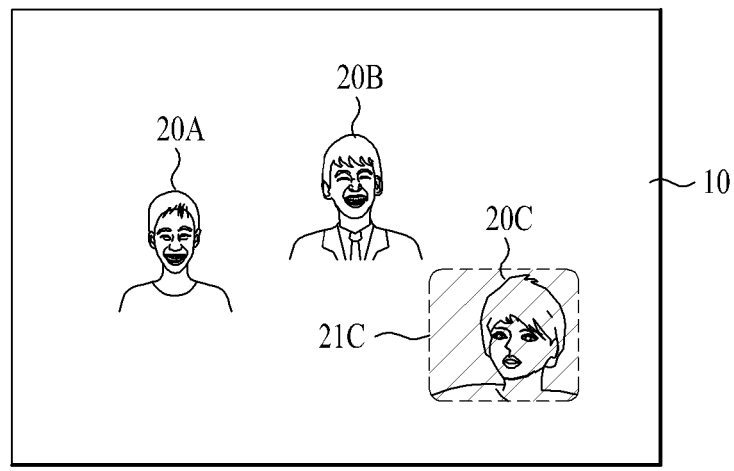
(b)

FIG. 20
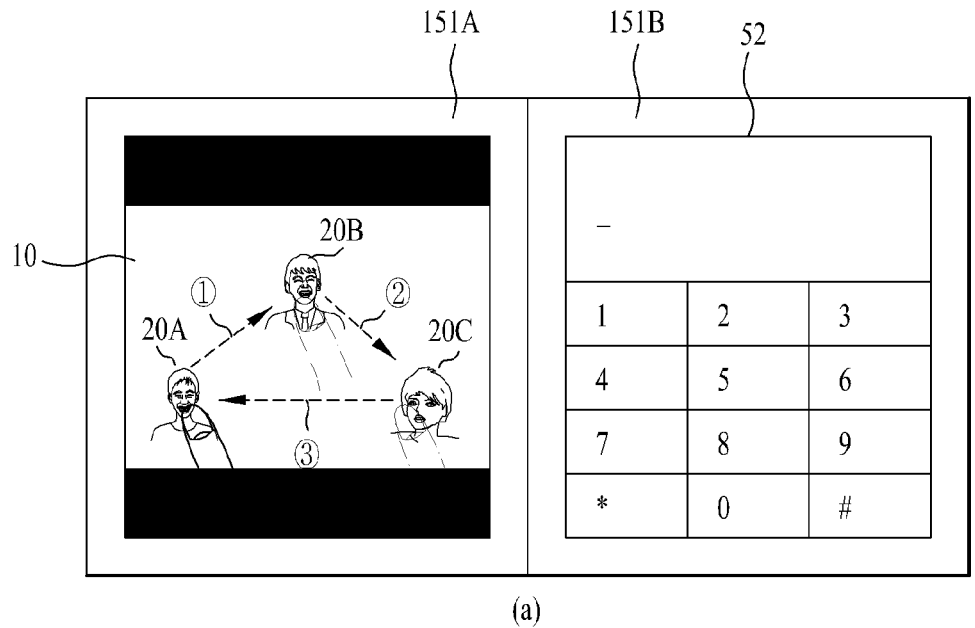
(a)
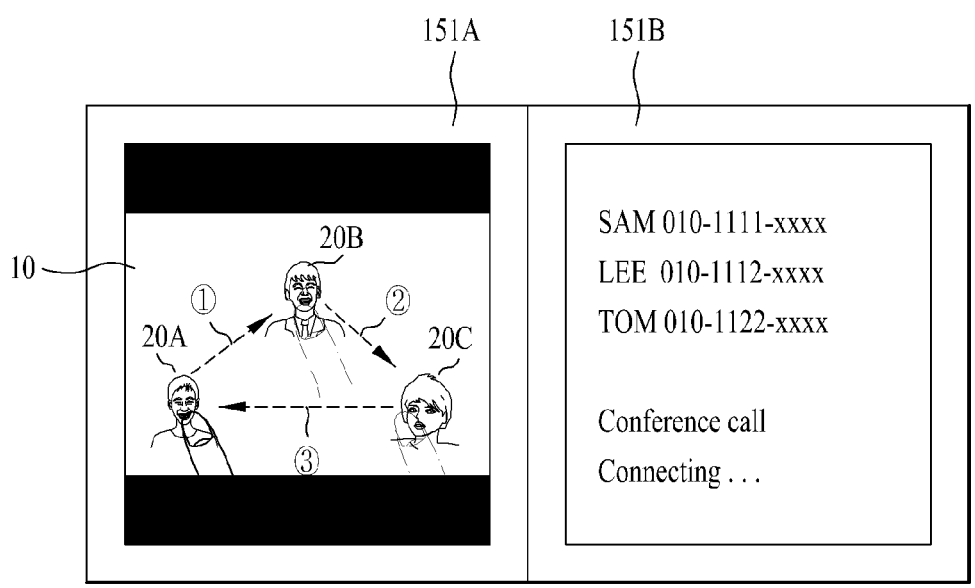
(b)

FIG. 26
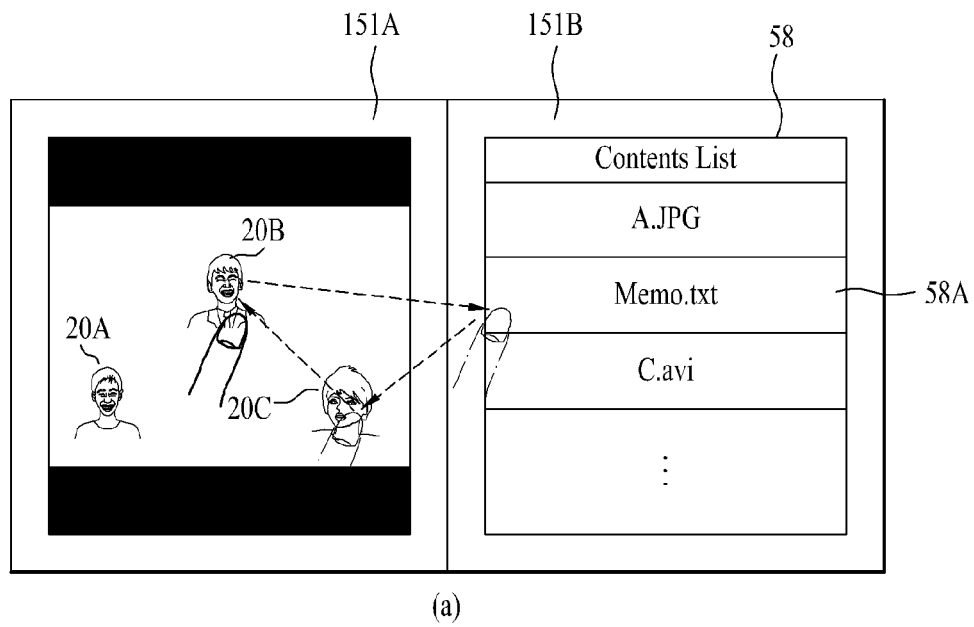
(a)
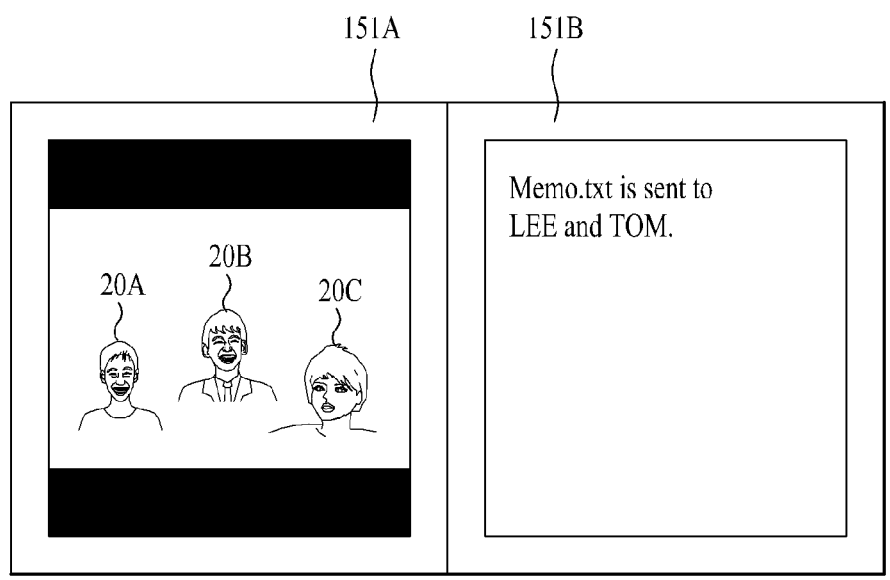
(b)

FIG. 27
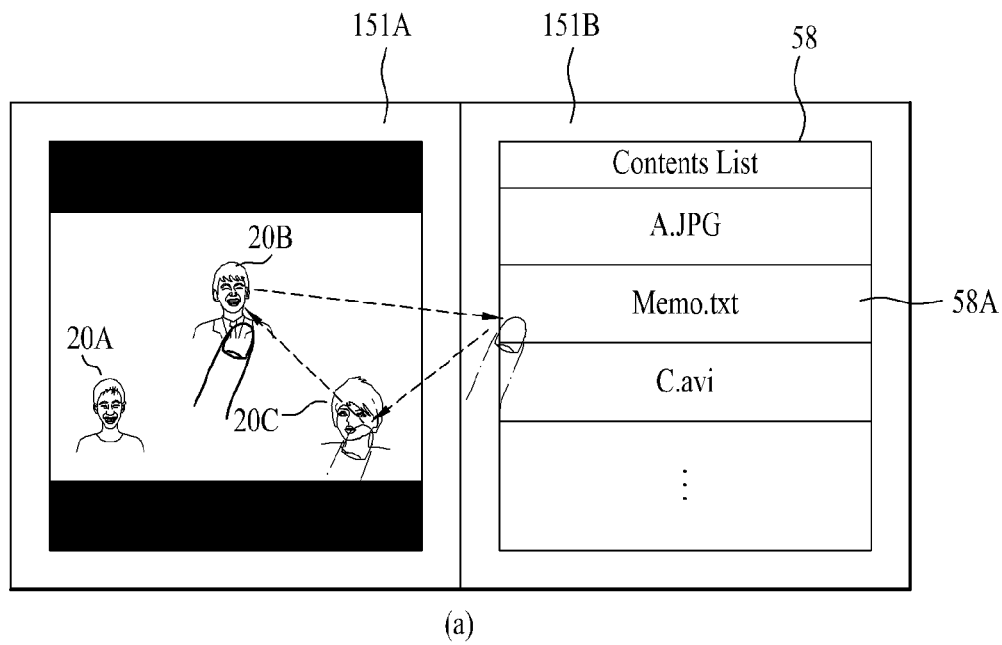
(a)
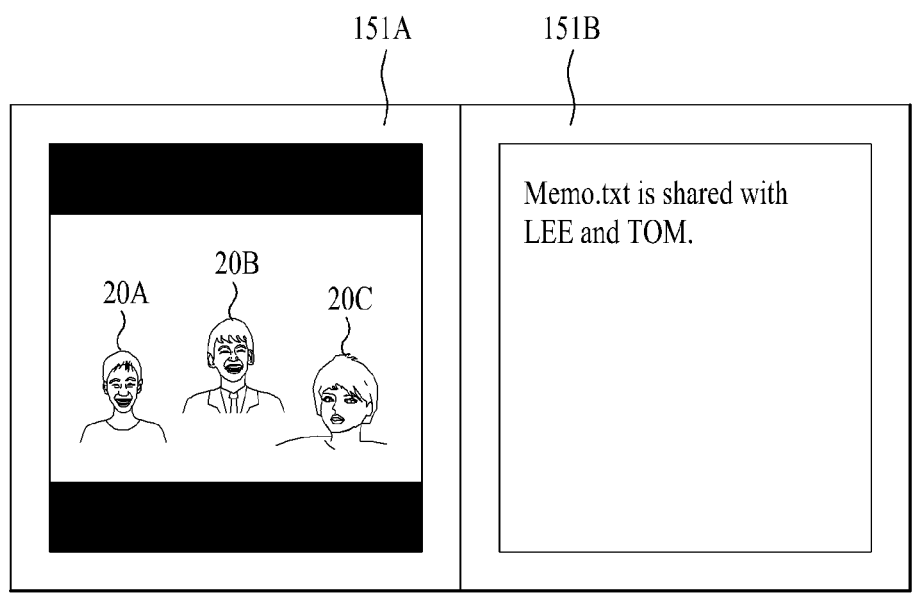
(b)

Conversation group 'Friends' is set to SAM and LEE.

(c)

FIG. 32
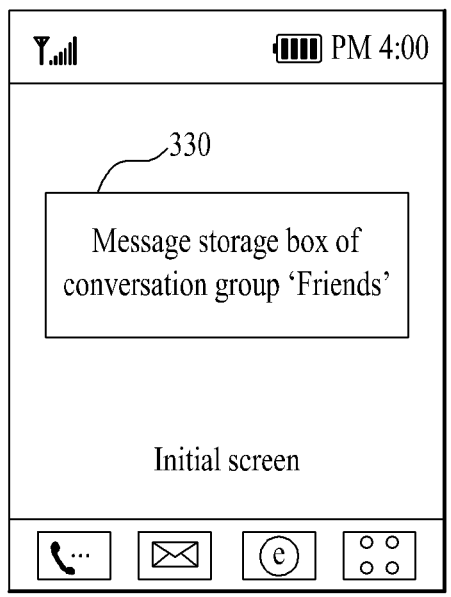
(a)
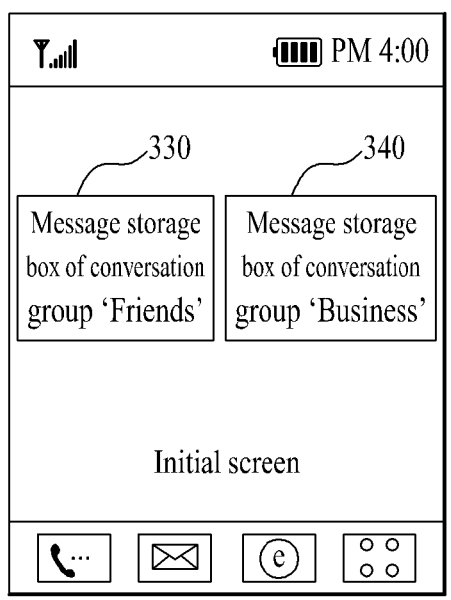
(b)

FIG. 34

| Message List Related to Conversation Group 'Business' | | | |
|---|---|---|---|
| 1. User PM 4:00 | Hi, guys! | ✉ MMS | — 411 |
| 2. SAM PM 4:05 | Hi! | ✉ e-mail | — 412 |
| 3. KIM PM 4:07 | Wow! | ✉ SNS | — 413 |
| 4. BOB PM 4:10 | Nice to meet you! | ✉ MMS | — 414 |

(a)

| Message List Related to Conversation Group 'Business' | | | |
|---|---|---|---|
| 1. User | Hi, guys! | ✉ MMS | — 411 |
| 2. BOB | Nice to meet you! | ✉ MMS | — 414 |
| 3. SAM | Hi! | ✉ e-mail | — 412 |
| 4. KIM PM 4:07 | Wow! | ✉ SNS | — 413 |

(b)

FIG. 35
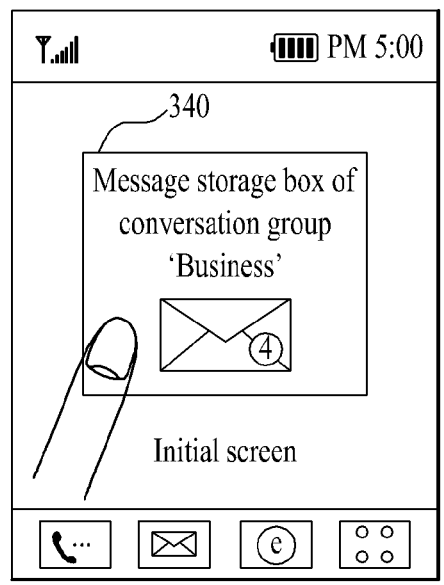
(a)
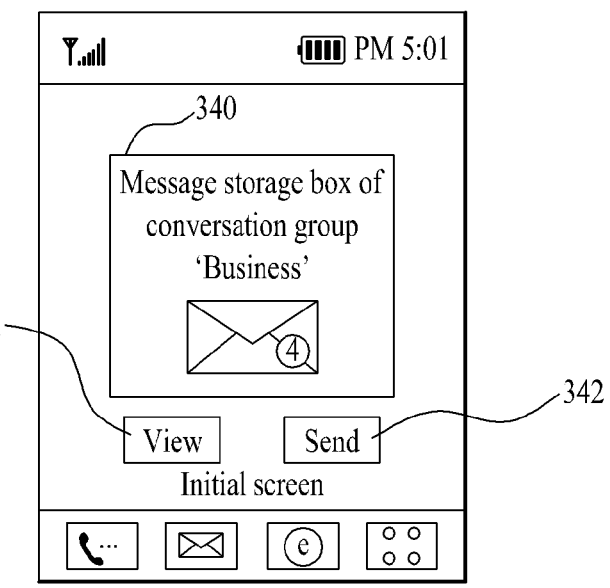
(b)

MOBILE TERMINAL AND CONTROLLING METHOD THEREOF

Pursuant to 35 U.S.C. §119(a), this application claims the benefit of earlier filing date and right of priority to Korean Applications Nos. 10-2010-0035754, filed on Apr. 19, 2010 and 10-2010-0055860, filed on Jun. 14, 2010, the contents of which are hereby incorporated by reference herein in their entirety.

BACKGROUND OF THE INVENTION

1. Field of the Invention

The present invention relates to a mobile terminal, and more particularly, to a mobile terminal and controlling method thereof. Although the present invention is suitable for a wide scope of applications, it is particularly suitable for facilitating a terminal to be used in further consideration of user's convenience.

2. Discussion of the Related Art

A mobile terminal is a device which may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals according to a presence or non-presence of mobility. And, the mobile terminals can be further classified into handheld terminals and vehicle mount terminals according to availability for hand-carry.

There are ongoing efforts to support and increase the functionality of mobile terminals. Such efforts include software and hardware improvements, as well as changes and improvements in the structural components which form the mobile terminal.

Recently, a mobile terminal provides functions of performing such a group communication with at least two counterpart terminals as a conference call, a chatting and the like.

SUMMARY OF THE INVENTION

Accordingly, the present invention is directed to a mobile terminal and controlling method thereof that substantially obviate one or more problems due to limitations and disadvantages of the related art.

An object of the present invention is to provide a mobile terminal and controlling method thereof, by which group communications of various types with a conversation group can be performed in a manner of forming the group of conversation with at least two counterpart terminals using an image including at least two character pictures.

Another object of the present invention is to provide a mobile terminal and controlling method thereof, by which message transceiving contents with counterpart terminals belonging to a conversation group are grouped into one to consecutively display the grouped message transceiving contents in a single image.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to the present invention includes a wireless communication unit, a display unit configured to display an image including at least two character pictures, a memory provided with contact information respectively related to the at least two character pictures, a controller configured to control the wireless communication unit to communicate with counterpart terminals corresponding to the contact information, the controller, if the at least two character pictures in the image are selected, to search at least two contact informations related to the selected character pictures in the memory, to form a conversation group with the searched contact information, and to control the wireless communication unit to perform a group communication with the conversation group by at least one scheme.

In another aspect of the present invention, a method of controlling a mobile terminal according to the present invention includes the steps of displaying an image including at least two character pictures on a display unit of the mobile terminal, if the at least two character pictures in the image are selected, searching a memory of the mobile terminal for contact information respectively related to the selected character pictures, forming a conversation group with the searched contact information, and performing a group communication with the conversation group by at least one scheme.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures. In the drawings:

FIG. 6 is a diagram of screen configurations of a process for setting corresponding contact information at each face feature information of character pictures included in an image according to a first embodiment of the present invention;

FIGS. 10 to 15 are diagrams of screen configurations of a process for performing a group communication on contact information corresponding to each character picture included in an image according to a first embodiment of the present invention;

FIGS. 17 to 27 are diagrams of screen configurations of a process for performing a group communication on contact information corresponding to each character picture included in an image according to a second embodiment of the present invention;

FIGS. 29 to 32 are diagrams of screen configurations of a process for forming a conversation group according to a second aspect of the present invention;

FIGS. 34 to 37 are diagrams of screen configurations of a process for grouping message contents transceived with counterpart terminals belonging to a conversation group into one group and displaying the one group on a single screen according to a second aspect of the present invention.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present invention can be applicable to a various types of terminals. Examples of such terminals include mobile as well as stationary terminals, such as mobile phones, user equipment, smart phones, DTV, computers, digital broadcast terminals, personal digital assistants, portable multimedia players (PMP) and navigators.

However, by way of non-limiting example only, further description will be with regard to a mobile terminal 100, and it should be noted that such teachings may apply equally to other types of terminals.

Figure 1:
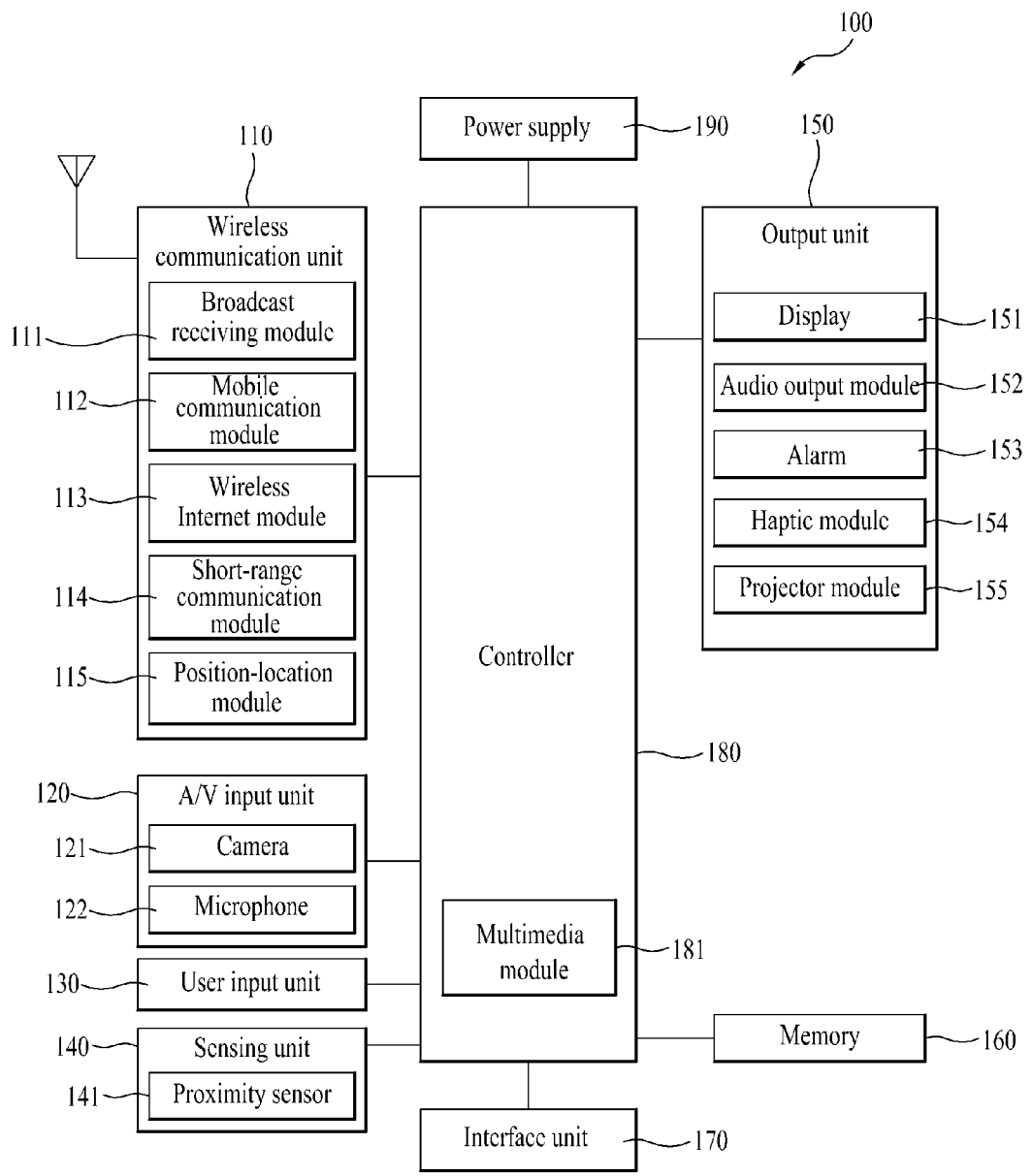
FIG. 1 is a block diagram of a mobile terminal according to one embodiment of the present invention.

FIG. 1 is a block diagram of a mobile terminal 100 in accordance with an embodiment of the present invention. FIG. 1 shows the mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 generally includes one or more components which permit wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel.

A broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

At least two broadcast receiving modules 111 can be provided to the mobile terminal 100 in pursuit of simultaneous receptions of at least two broadcast channels or broadcast channel switching facilitation.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 can be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), DVB-CBMS, OMA-BCAST, the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia message transceivings, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), etc.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise recognizes the location of the mobile terminal 100. If desired, this module may be implemented with a global positioning system (GPS) module.

Referring to FIG. 1, the audio/video (A/V) input unit 120 is configured to provide audio or video signal input to the mobile terminal 100. As shown, the A/V input unit 120 includes a camera 121 and a microphone 122.

The camera 121 possesses a digital zoom and processes image frames of still pictures or video, which are recognized by an image sensor in a video call mode or a photographing mode. And, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition mode. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates output relevant to the senses of sight, hearing, touch and the like. And, the output unit 150 includes the display 151, an audio output module 152, an alarm unit 153, a haptic module 154, a projector module 155 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display 151 can be implemented in the optical transmittive type as well. In this configuration, a user is able to see an object behind a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In case that the display 151 and a sensor for detecting a touch action (hereinafter called 'touch sensor') configures a mutual layer structure (hereinafter called 'touchscreen'), it is able to use the display 151 as an input device as well as an output device. In this case, the touch sensor can be configured as a touch film, a touch sheet, a touchpad or the like.

The touch sensor can be configured to convert a pressure applied to a specific portion of the display 151 or a variation of a capacitance generated from a specific portion of the display 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

Referring to FIG. 1, a proximity sensor 141 can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

In the following description, for clarity, an action that a pointer approaches without contacting with the touchscreen to be recognized as located on the touchscreen is named 'proximity touch'. And, an action that a pointer actually touches the touchscreen is named 'contact touch'. The meaning of the position on the touchscreen proximity-touched by the pointer means the position of the pointer which vertically opposes the touchscreen when the pointer performs the proximity touch.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 outputs a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skin, the effect attributed to the contact with electrode, the effect attributed to the electrostatic force, the effect attributed to the representation of hot/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. And, the projector module 155 is able to display an image, which is identical to or partially different at least from the image displayed on the display 151, on an external screen or wall according to a control signal of the controller 180.

In particular, the projector module 155 can include a light source (not shown in the drawing) generating light (e.g., laser) for projecting an image externally, an image producing means (not shown in the drawing) for producing an image to output externally using the light generated from the light source, and a lens (not shown in the drawing) for enlarging to output the image externally in a predetermined focus distance. And, the projector module 155 can further include a device (not shown in the drawing) for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. And, it is understood that the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

Moreover, a face recognition application for recognizing a face picture of a character is provided to the memory 160.

In this case, the face recognition application is executed under the control of the controller 180. Alternatively, the face recognition application is provided as a module within the controller 180 to enable the controller 180 to perform the same operation of the face recognition application.

In the following description, assume that the face recognition application is provided as a module within the controller 180 to enable the controller 180 to perform the same operation of the face recognition application.

In particular, the face recognition application extracts a feature value of each face picture included in an image displayed on the display unit 151 using a face recognition algorithm and enables the extracted feature value of the face picture to be stored in contact information of a corresponding character according to a user manipulation. In this case, the face recognition algorithm can include one of PCA (principal component analysis), FDA (fisher discriminate analysis), ICA (independent component analysis) and the like.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on the internet.

The interface unit 170 is often implemented to couple the mobile terminal 100 with external devices. The interface unit 170 receives data from the external devices or is supplied with power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module stores various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern recognizing process for recognizing a written input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2A:
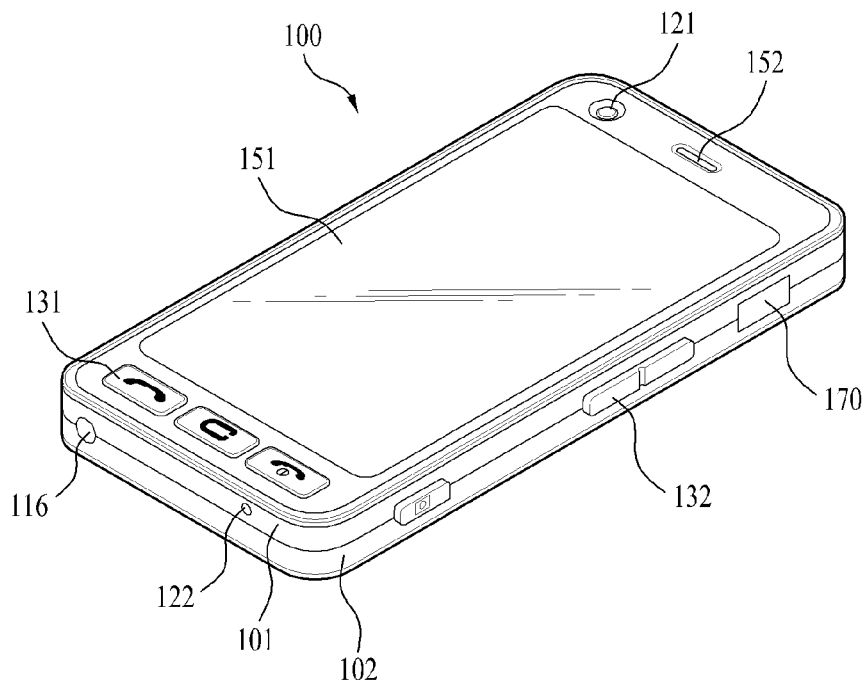
FIG. 2A is a front perspective diagram of a mobile terminal according to one embodiment of the present invention.

FIG. 2A is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2A, the mobile terminal 100 includes a case (casing, housing, cover, etc.) configuring an exterior thereof. In the present embodiment, the case can be divided into a front case 101 and a rear case 102. Various electric/electronic parts are loaded in a space provided between the front and rear cases 101 and 102. Optionally, at least one middle case can be further provided between the front and rear cases 101 and 102.

The cases 101 and 102 are formed by injection molding of synthetic resin or can be formed of metal such as stainless steel (STS), titanium (Ti) or the like.

A display 151, an audio output unit 152, a camera 121, user input units 130/131 and 132, a microphone 122, an interface 170 and the like can be provided to the terminal body, and more particularly, to the front case 101.

The display 151 occupies most of a main face of the front case 101. The audio output unit 152 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. And, the input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. And, a command for a volume adjustment of sound outputted from the audio output unit 152, a command for a switching to a touch recognizing mode of the display 151 or the like can be inputted to the second manipulating unit 132.

Figure 2B:
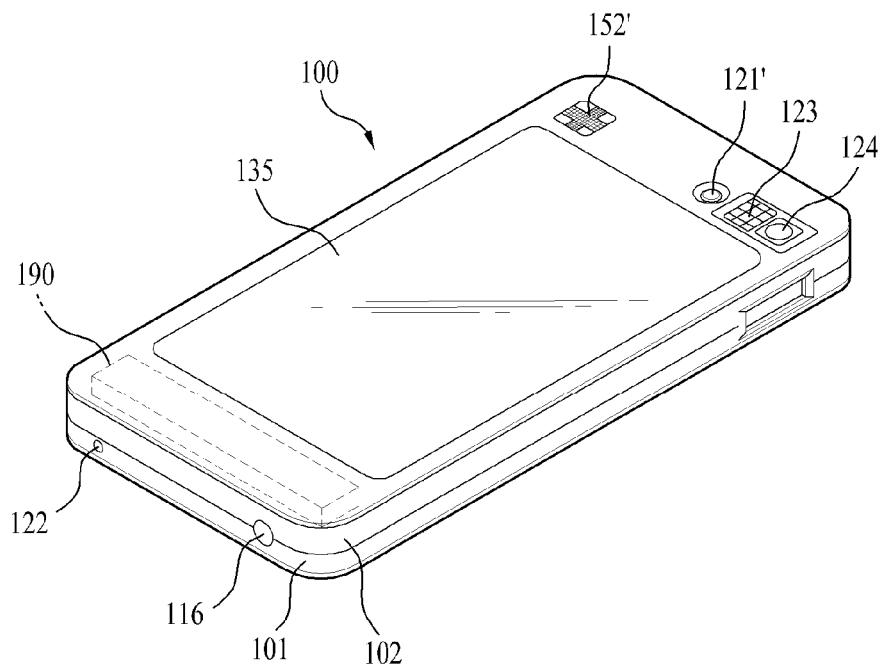
FIG. 2B is a rear perspective diagram of a mobile terminal according to one embodiment of the present invention.

FIG. 2B is a perspective diagram of a backside of the terminal shown in FIG. 2A.

Referring to FIG. 2B, a camera 121' can be additionally provided to a backside of the terminal body, and more particularly, to the rear case 102. The camera 121 has a photographing direction that is substantially opposite to that of the former camera 121 shown in FIG. 21A and may have pixels differing from those of the former camera 121.

Preferably, for instance, the former camera 121 has low pixels enough to capture and transmit a picture of user's face for a video call, while the latter camera 121' has high pixels for capturing a general subject for photography without transmitting the captured subject. And, each of the cameras 121 and 121' can be installed at the terminal body to be rotated or popped up.

A flash 123 and a mirror 124 are additionally provided adjacent to the camera 121'. The flash 123 projects light toward a subject in case of photographing the subject using the camera 121'. In case that a user attempts to take a picture of the user (self-photography) using the camera 121', the mirror 124 enables the user to view user's face reflected by the mirror 124.

An additional audio output unit 152' can be provided to the backside of the terminal body. The additional audio output unit 152' is able to implement a stereo function together with the former audio output unit 152 shown in FIG. 2A and may be used for implementation of a speakerphone mode in talking over the terminal.

A broadcast signal receiving antenna can be additionally provided to the lateral side of the terminal body as well as an antenna for communication or the like. The antenna constructing a portion of the broadcast receiving module 111 shown in FIG. 1 can be retractably provided to the terminal body.

A power supply unit 190 for supplying power to the terminal 100 is provided to the terminal body. And, the power supply unit 190 can be configured to be built within the terminal body. Alternatively, the power supply unit 190 can be configured to be detachably connected to the terminal body.

A touchpad 135 for detecting a touch can be additionally provided to the rear case 102. The touchpad 135 can be configured in a light transmittive type like the display 151. In this case, if the display 151 is configured to output visual information from both faces, it is able to recognize the visual information via the touchpad 135 as well. The information outputted from both of the faces can be entirely controlled by the touchpad 135. Alternatively, a display is further provided to the touchpad 135 so that a touchscreen can be provided to the rear case 102 as well.

The touchpad 135 is activated by interconnecting with the display 151 of the front case 101. The touchpad 135 can be provided in rear of the display 151 in parallel. The touchpad 135 can have a size equal to or smaller than that of the display 151.

In the following description, aspects of the present invention are explained with reference to FIGS. 3 to 37.

[First Aspect]

A first aspect of the present invention relates to a process for performing a group communication with a conversation group that is formed with contacts corresponding to character pictures using an image having at least two character pictures included therein.

In the following description, a first aspect of the present invention is explained with reference to FIGS. 3 to 27.

First of all, a process for setting contact information corresponding to character pictures in an image, in which at least two character pictures are included, is described with reference to FIGS. 3 to 6 as follows.

Figure 3:
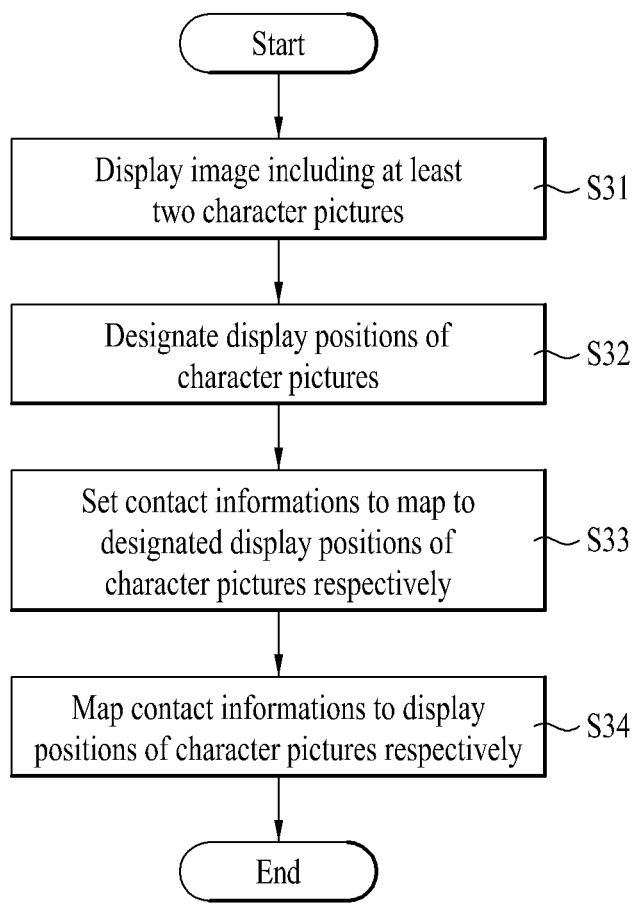
FIG. 3 is a flowchart of a process for setting corresponding contact information at each display position of character pictures included in an image according to a first embodiment of the present invention.

FIG. 3 is a flowchart of a process for setting corresponding contact information at each display position of character pictures included in an image according to a first embodiment of the present invention.

Figure 4:
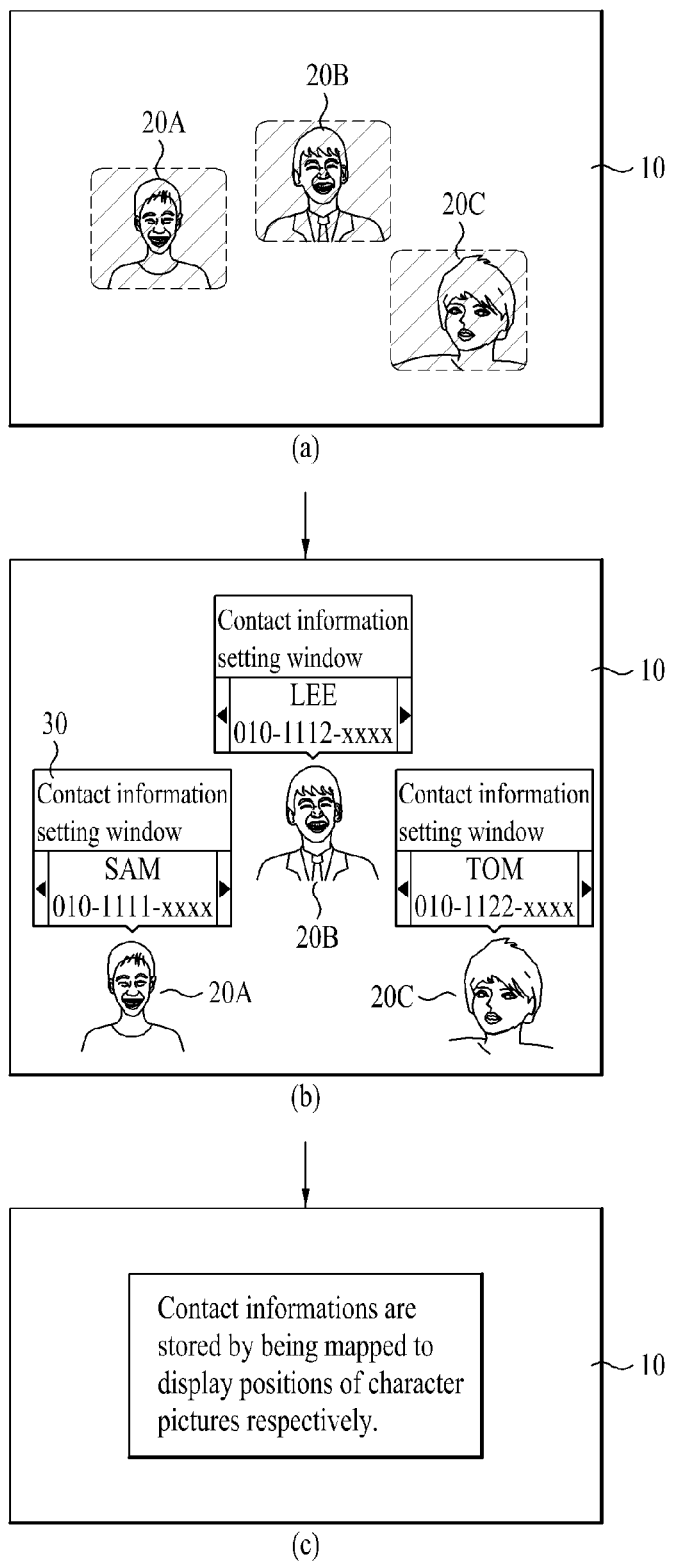
FIG. 4 is a diagram of screen configurations of a process for setting corresponding contact information at each display position of character pictures included in an image according to a first embodiment of the present invention.

And, FIG. 4 is a diagram of screen configurations of a process for setting corresponding contact information at each display position of character pictures included in an image according to a first embodiment of the present invention.

Referring to FIG. 3 and FIG. 4, if a user selects an image 10, in which at least two or more character pictures 20A, 20B and 20C are included, from the memory 160, the controller 180 displays the selected image 10 on the touchscreen 151 [S31 and FIG. 4 (a)].

In this case, the image 10 can include a still or moving image provided as a default to the memory 160, an image taken via the camera 121 or an image downloaded from a webpage accessed via the wireless communication unit 110.

If the user designates display positions of the character pictures 20A, 20B and 20C in the image 10 [S32] [FIG. 4 (a)], the controller 180 displays a contact information setting window 30 for setting contact information to map on each of the designated display positions of the character pictures 20A, 20B and 20C [FIG. 4 (b)].

In this case, the user is able to designate the display position of each of the character pictures 20A, 20B and 20C in a manner of dragging a region, in which the corresponding character picture is displayed, within the image 10.

Alternatively, the user is able to designate the display position of each of the character pictures 20A, 20B and 20C in a manner of designating a boundary of a region, in which the corresponding character picture is displayed, within the image 10.

Moreover, the display position of each of the character pictures 20A, 20B and 20C can becomes a display position range of pixels. For instance, if a size of the image 10 amounts to 600×400 pixels (width×length) and a pixel range occupied by the first character picture 20A within the image 10 amounts to a width of 150~220 and a length of 250~300, the information on the display position of the first character picture 20A becomes a width of 150~220 and a length of 250~300.

Moreover, the user is able to directly input the contact information on each of the character pictures 20A, 20B and 20C via the corresponding contact information setting window 30. Alternatively, the user is able to set contact information by searching the memory 160 for the contact information to map to each of the character pictures 20A, 20B and 20C.

Meanwhile, the contact information means the information including at least one of a name, home phone number, mobile phone number, email address, fax number and website address of a corresponding character.

After the contact information designated to the character pictures 20A, 20B and 20C have been set [S33] [FIG. 4 (b)], the controller 180 maps the designated display position information of the character pictures 20A, 20B and 20C and the set contact information to each other and then stores the mapped information in the memory 160 [S34] [FIG. 4 (c)].

Figure 5:
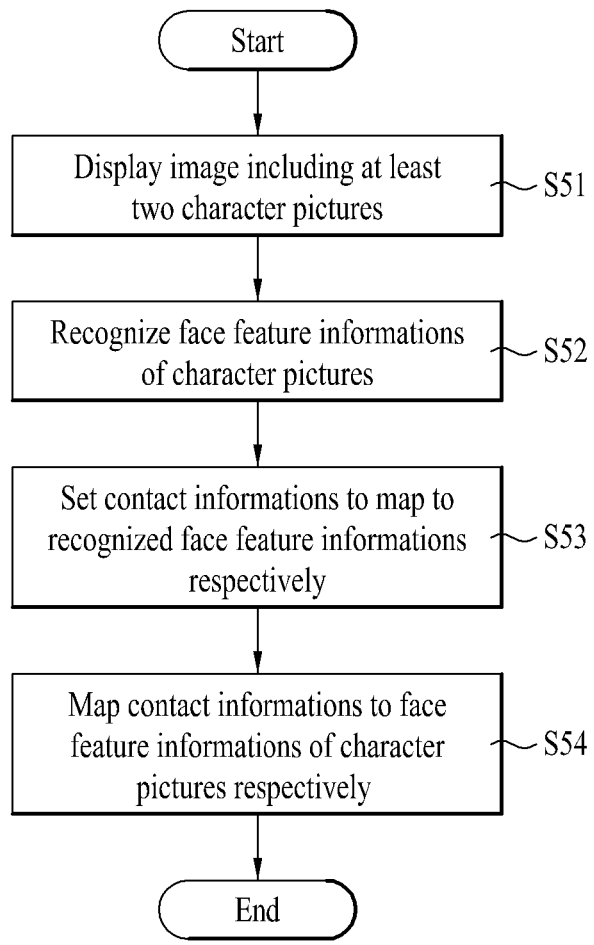
FIG. 5 is a flowchart of a process for setting corresponding contact information at each face feature information of character pictures included in an image according to a first embodiment of the present invention.

FIG. 5 is a flowchart of a process for setting corresponding contact information at each face feature information of character pictures included in an image.

FIG. 6 is a diagram of screen configurations of a process for setting corresponding contact information at each face feature information of character pictures included in an image.

Referring to FIG. 5 and FIG. 6, if a user selects an image 10, in which at least two or more character pictures 20A, 20B and 20C are included, from the memory 160, the controller 180 displays the selected image 10 on the touchscreen 151 [S51] [FIG. 6 (a)].

If the user designates display positions of the character pictures 20A, 20B and 20C in the image 10, the controller 180 drives a face recognition application provided to the memory 160 and then recognizes face feature information of each of the character pictures 20A, 20B and 20C via the face recognition application [S52].

If the face feature information on each of the character pictures 20A, 20B and 20C is recognized, the controller 180 displays a contact information setting window 30 for setting contact information to map to the face feature information of each of the character pictures 20A, 20B and 20C [FIG. 6 (b)].

If the contact information of the character pictures 20A, 20B and 20C are set via the contact information setting windows 30, respectively [S53] [FIG. 6 (b)], the controller 180 maps the face feature information of the character pictures 20A, 20B and 20C and the set contact information to each other and then stores the mapped information in the memory 160 [S54] [FIG. 6 (c)].

In this case, the controller 180 enables the recognized face feature information to be stored in the contact information of the corresponding character pictures 20A, 20B and 20C, respectively.

In the above description, so far, the process for setting the contact information, which corresponds to each of the at least two character pictures 20A, 20B and 20C, in the image 10 is described with reference to FIGS. 3 to 6.

In the following description, if at least two character pictures are selected from the image 10, in which the contact information is set by the process shown in FIGS. 3 to 6, a process for performing group communications of various types on the contact information corresponding to the selected character pictures is explained in detail with reference to FIGS. 7 to 27.

Assume that the mobile terminal 100 is able to have a single tasking mode for executing a display function of the image 10 and a multitasking mode for simultaneously executing the display function of the image 10 and another function selected by a user.

In the following description with reference to FIGS. 7 to 15, in case that the mobile terminal 100 is in the single tasking mode for executing the display function of the image 10, a process for performing group communications of various types on contacts corresponding to the character pictures using the character pictures included in the image 10 according to a first embodiment of the present invention is explained in detail with reference to FIGS. 7 to 15.

Figure 7:
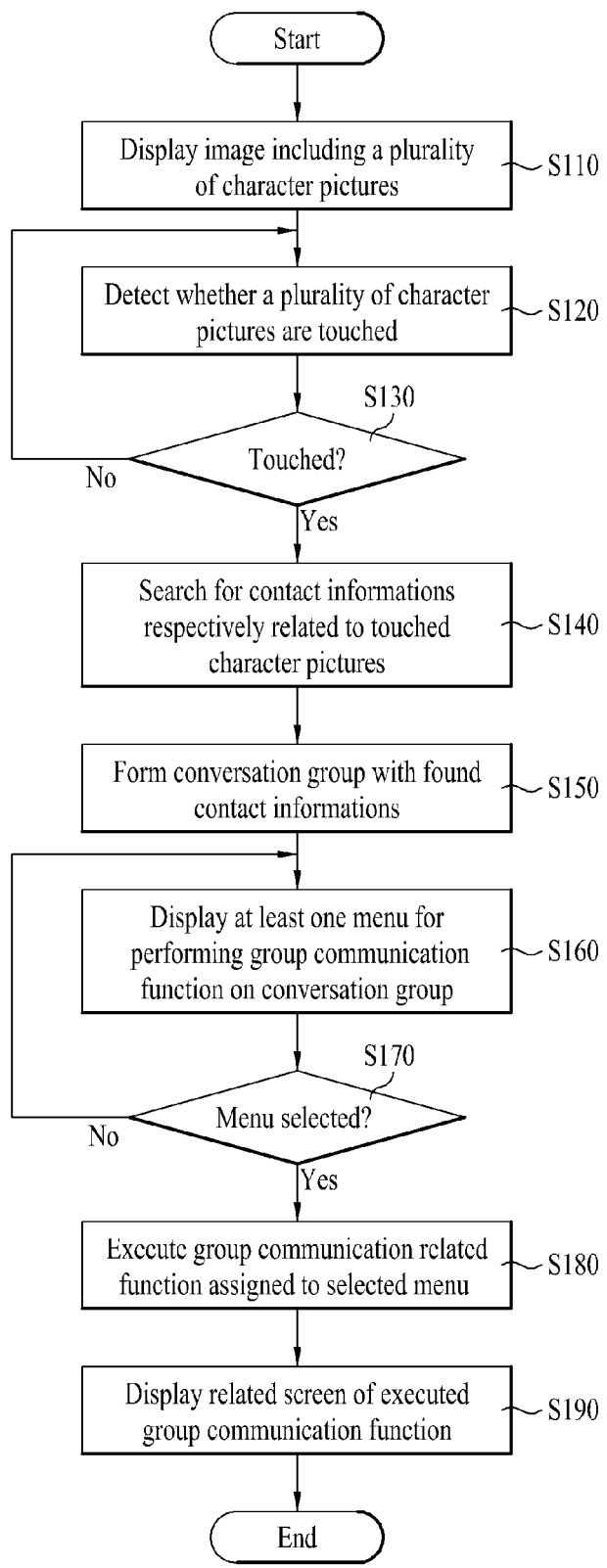
FIG. 7 is a flowchart of a process for performing a group communication on contact information corresponding to each character picture included in an image according to a first embodiment of the present invention.

FIG. 7 is a flowchart of a process for performing a group communication on contact information corresponding to each character picture included in an image according to a first embodiment of the present invention.

Figure 8:
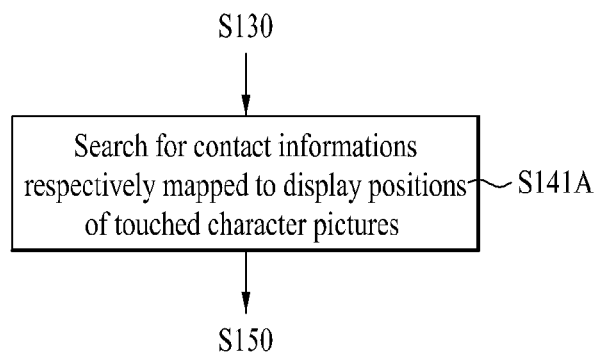
FIG. 8 and FIG. 9 are flowcharts of a process for searching for contact information mapped to each character picture selected from an image according to a first embodiment of the present invention.
Figure 9:
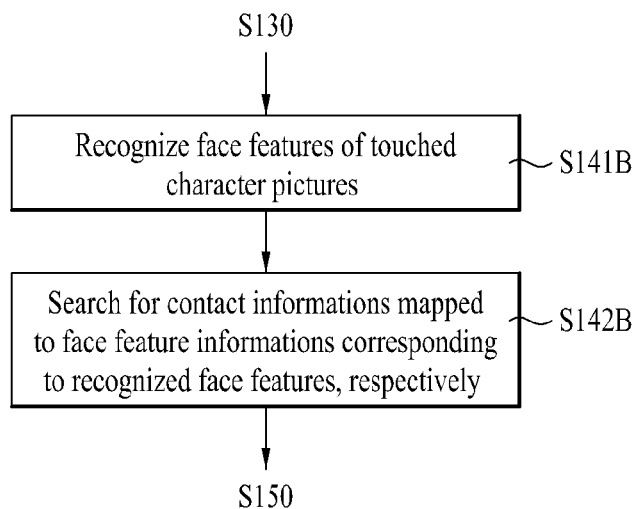

FIG. 8 and FIG. 9 are flowcharts of a process for searching for contact information mapped to each character picture selected from an image according to a first embodiment of the present invention.

FIGS. 10 to 15 are diagrams of screen configurations of a process for performing a group communication on contact information corresponding to each character picture included in an image according to a first embodiment of the present invention.

Referring to FIGS. 7 to 15, the controller 180 displays an image 10, in which at least two character pictures 20A, 20B and 20C are included, on the touchscreen 151 [S110] and detects whether at least two character pictures in the image 10 are touched [S120].

If the at least two character pictures in the image 10 are touched [S130], the controller 180 searches the memory 160 for contact information related to the touched character pictures [S140].

In doing so, the searching step S140 is performed by the following process shown in FIG. 8 and FIG. 9.

In particular, referring to FIG. 8, the controller 180 recognizes the touched points of the character pictures in the image 10 and then searches the display position information of the character pictures stored in the memory by the process shown in FIG. 3 and FIG. 4 for the contact information mapped to the display position information of the character pictures corresponding to the recognized touched points, respectively [S141A].

Referring to FIG. 9, if the character pictures in the image 10 are touched, the controller 180 drives the face recognition application provided within the memory 160, recognizes face recognition features of the touched character pictures via the face recognition application [S141B], and then searches the face feature information stored in the memory 160 by the process shown in FIG. 5 and FIG. 6 for the contact information mapped to the face feature information corresponding to the recognized face features, respectively [S142B].

If the contact information related to the touched character pictures are found from the memory 160 by the process shown in FIG. 8 and FIG. 9, the controller 180 forms a conversation group with the found contact information [S150] and then displays at least one menu for performing a group communication function with the formed conversation group [S160].

In this case, the menu for the group communication can include at least one of an entry for a conference call to the formed conversation group, an entry for sending a broadcast message, an entry for a group chatting, an entry for sharing the image, an entry for a short-range communication connection and the like.

Once the conversation group is formed, the controller displays an input window for inputting a name of the conversation group. If the name of the formed conversation group is inputted via the input window, the controller 180 is able to set the name of the formed conversation group to the inputted name. Meanwhile, a content of the conversation group input window shall be described in detail in the description of a second embodiment of the present invention later.

If a specific entry is selected from the displayed menu [S170], the controller executes a group communication related function assigned to the selected entry [S180] and then displays an image related to the executed group communication function [S190].

Figure 10:
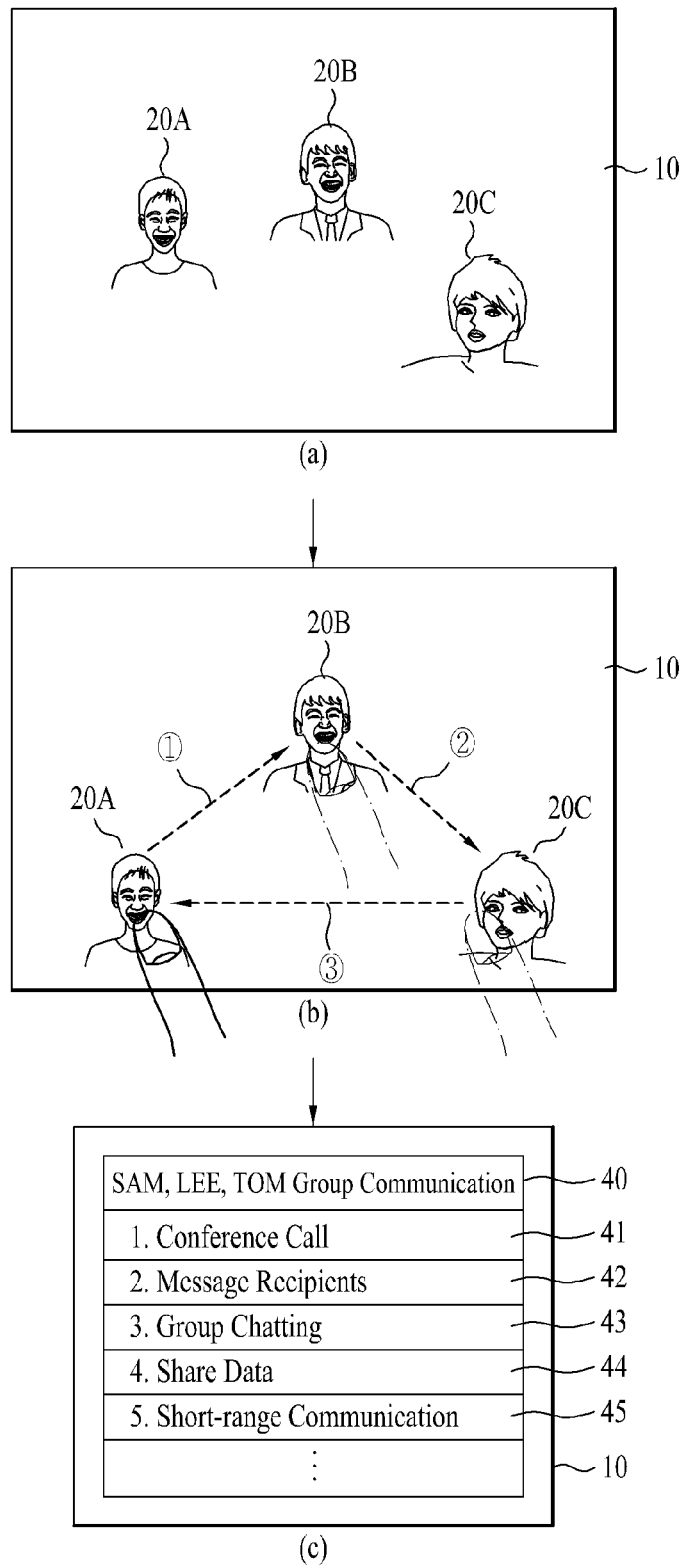

In particular, FIG. 10 (a) shows that an image 10 having first to third character pictures 20A, 20B and 20C included therein is displayed.

If the first to third character pictures 20A, 20B and 20C in the image 10 are touched [FIG. 10 (b)], the controller 180 searches the memory 160 for the contact information related to the touched first to third character pictures 20A, 20B and 20C by the former process described with reference to FIG. 8 and FIG. 9, forms a conversation group with the found contact information, and then displays a menu list 40 for the group communication with the conversation group [FIG. 10 (*c*)].

Meanwhile, after the image 10 has been displayed, but before the character pictures are touched by a user, the controller 180 identifiably displays the character pictures 20A, 20B and 20C, to which the contact information is mapped, with emphasis among the character pictures in the image 10. Therefore, the controller 180 enables the contact information mapped character pictures 20A, 20B and 20C to be identifiably displayed within the image 10.

In particular, the controller 180 displays the contact information mapped character pictures 20A, 20B and 20C by blinking or highlights. Therefore, the controller 180 enables the contact information mapped character pictures 20A, 20B and 20C to be well identified.

Moreover, the controller 180 keeps displaying touch recognition regions of the contact information mapped character pictures 20A, 20B and 20C for a preset duration. Therefore, the controller 180 enables the contact information mapped character pictures 20A, 20B and 20C to be well identified.

Thus, the controller 180 displays the contact information mapped character pictures 20A, 20B and 20C with emphasis, thereby informing a user of the contact information mapped character pictures among the character pictures 20A, 20B and 20C currently included in the image 10.

Meanwhile, referring to FIG. 10 (*b*), a touch type performed on the character pictures 20A, 20B and 20C can include a touch type using a start point and an end point.

In particular, while the first character picture 20A is initially touched as a start point [□], after the second and third character pictures 20B and 20C have been sequentially touched [□], if the initially touched first character picture 20A is finally touched again [□], the contact informations on the first to third character pictures 20A, 20B and 20C can be found.

Figure 11:
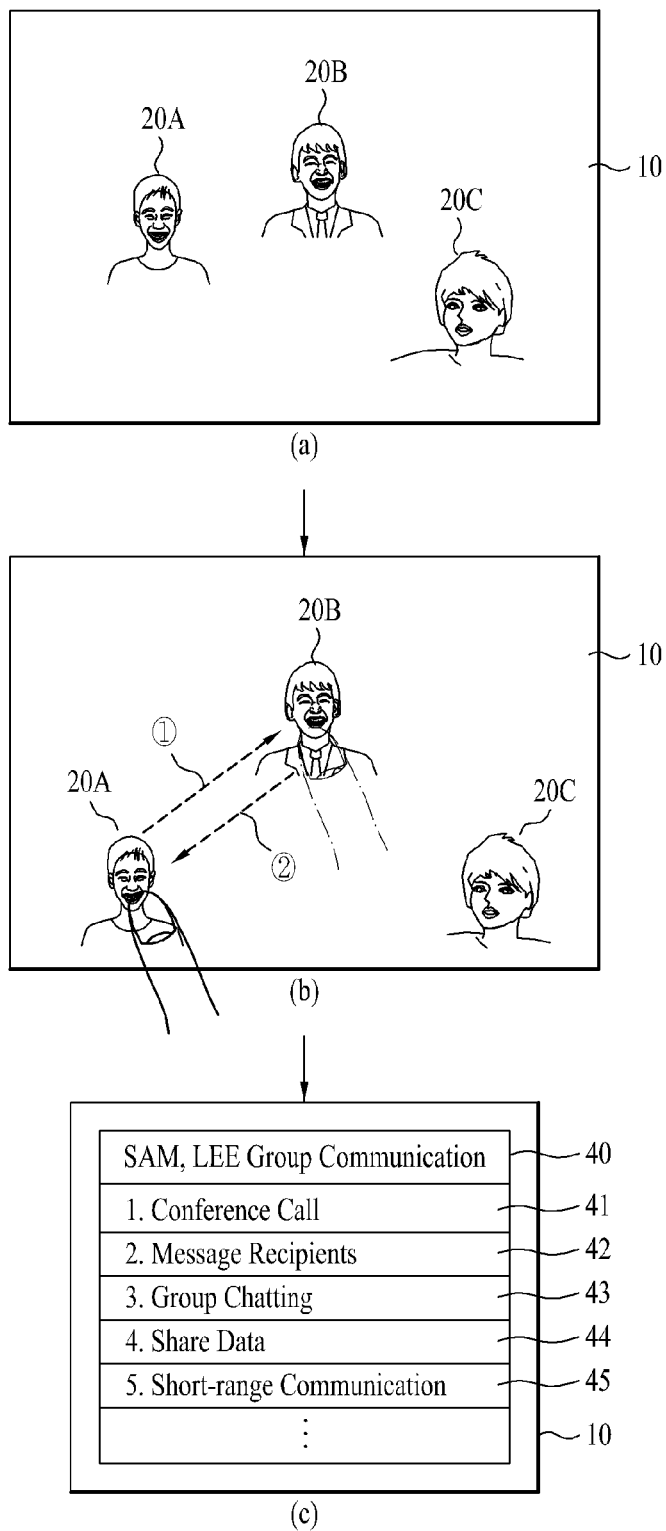

And, referring to FIG. 11 (*b*), while the first character picture 20A is initially touched as a start point [□], after the second character picture 20B has been touched, if the initially touched first character picture 20A is finally touched again [□], the contact information on the first and second character pictures 20A and 20B can be found.

If the conference call entry 41 is selected from the menu list 40 shown in FIG. 10 (*c*), the controller 180 controls the wireless communication unit 110 to connect a conference call to the formed conversation group.

If the message send entry 42 is selected from the menu list 40 shown in FIG. 10 (*c*), the controller 180 displays a message write window and then sets recipients to the contact informations belonging to the conversation group via the message write window.

If the group chatting entry 43 is selected from the menu list 40 shown in FIG. 10 (*c*), the controller 180 displays a chatting window and then sets conversation counterparts in the chatting window to the contact information belonging to the conversation group.

If the video sharing entry 444 is selected from the menu list 40 shown in FIG. 10 (*c*), the controller 180 controls the wireless communication unit 110 to transmit the image 10 to the conversation group.

If the short-range communication connect entry 45 is selected from the menu list 40 shown in FIG. 10 (*c*), the controller 180 controls the wireless communication unit 110 to connect short-range communication with the conversation group.

Figure 12:
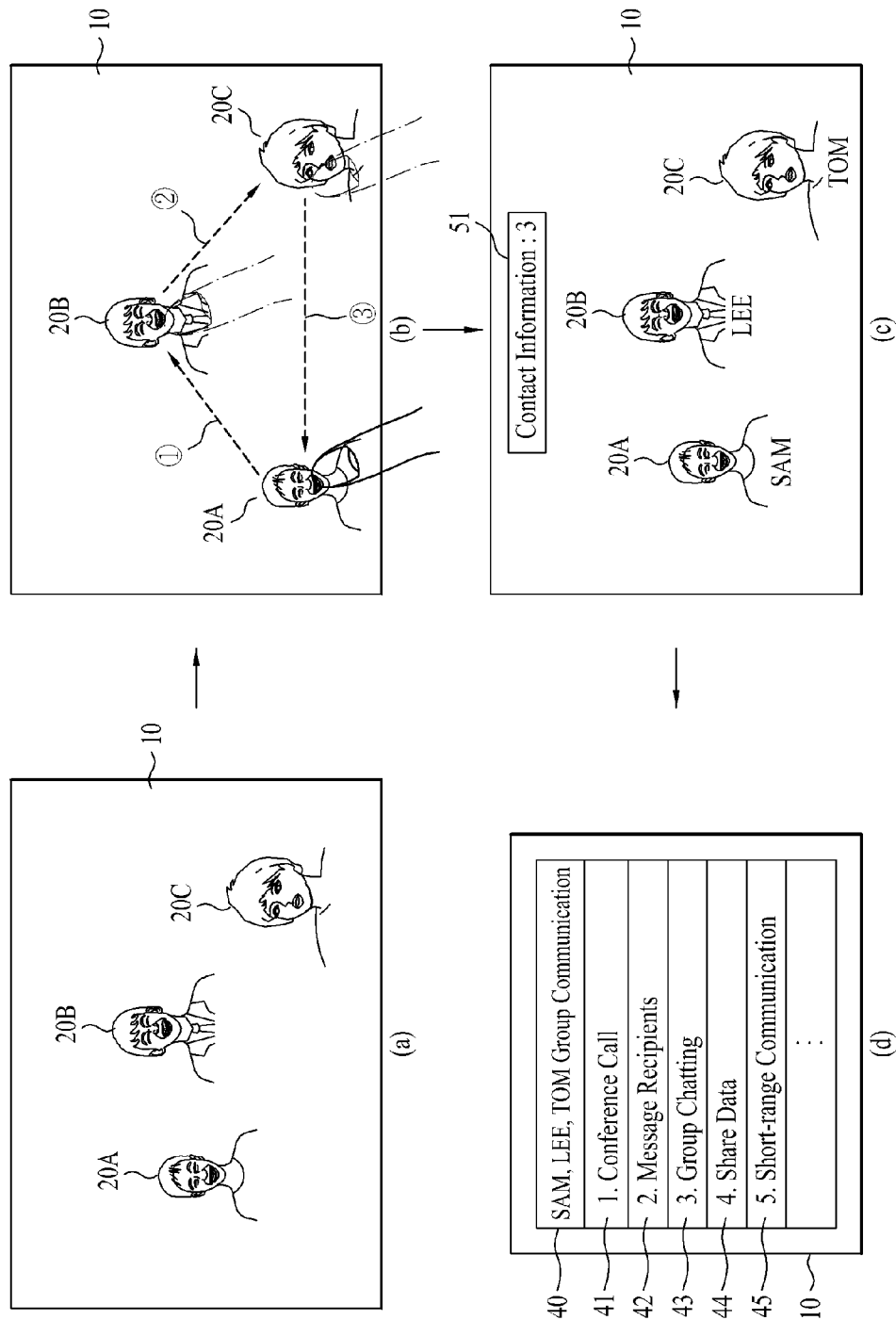

Subsequently, referring to FIG. 12 (*c*), the contact information related to the touched first to third character pictures 20A, 20B and 20C are found, the controller 180 displays information 51 indicating the number of the found contact information and names SAM, LEE and TOM respectively registered with the found contact information at the positions of the character pictures 20A, 20B and 20C in the image 10, respectively, and is then able to display a menu list 40 shown in FIG. 12 (*d*).

Referring to FIG. 13 (*a*), if a touch to a region outside a touch recognition region 21C of the third character picture 20C among the character pictures 20A, 20B and 20C is detected, the controller 180 determines that a missed touch to the third character picture 20C is generated. Subsequently, referring to FIG. 13 (*b*), in order for a user to touch the third character picture 20C correctly, the controller 180 is able to keep displaying the touch recognition region 21C of the third character picture 20C, from which the missed touch is generated, for a preset duration.

Figure 14:
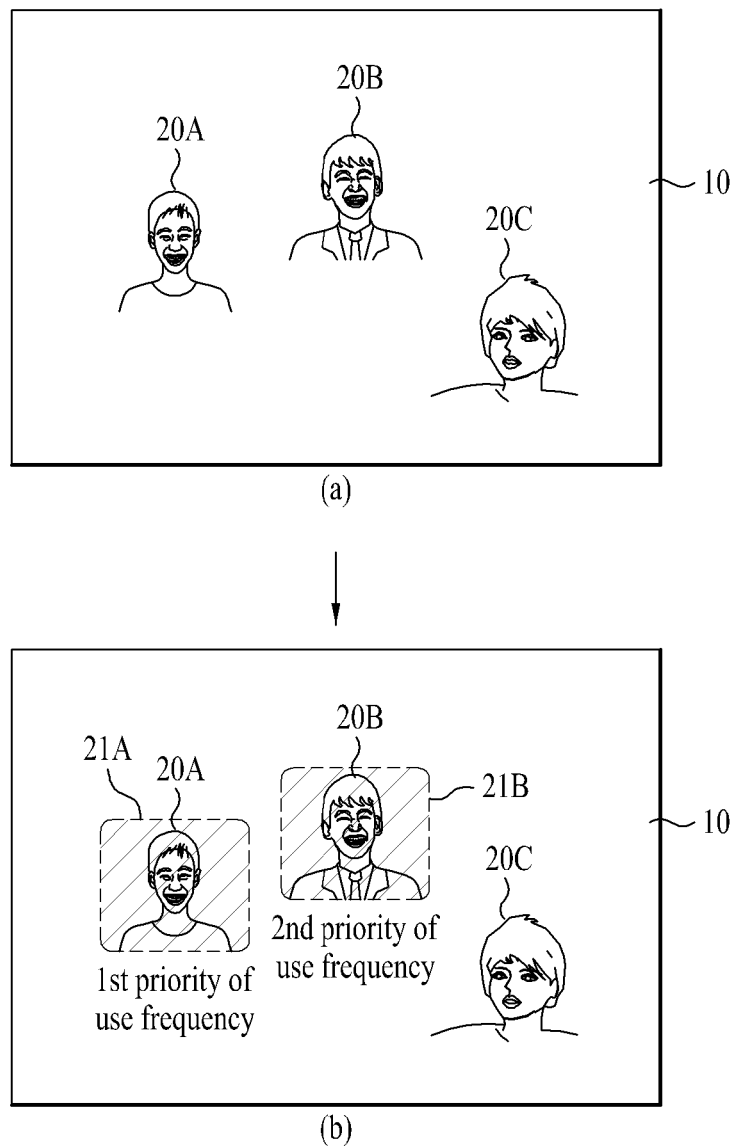

Referring to FIG. 14 (*a*), after the image 10 has been initially displayed, but before the character pictures 20A, 20B and 20C in the image 10 are touched, the controller recognizes a user's use frequency of the contact information respectively related to the character pictures 20A, 20B and 20C for a preset period of time. Subsequently, referring to FIG. 14 (*b*), the controller 180 is able to keep displaying touch recognition regions 21A and 21B of the first and second character pictures 20A and 20B corresponding to the contact information having the higher use frequencies, each of which is equal to or greater than a preset reference value, among the use frequencies of the recognized contact information during the preset period of time.

Figure 15:
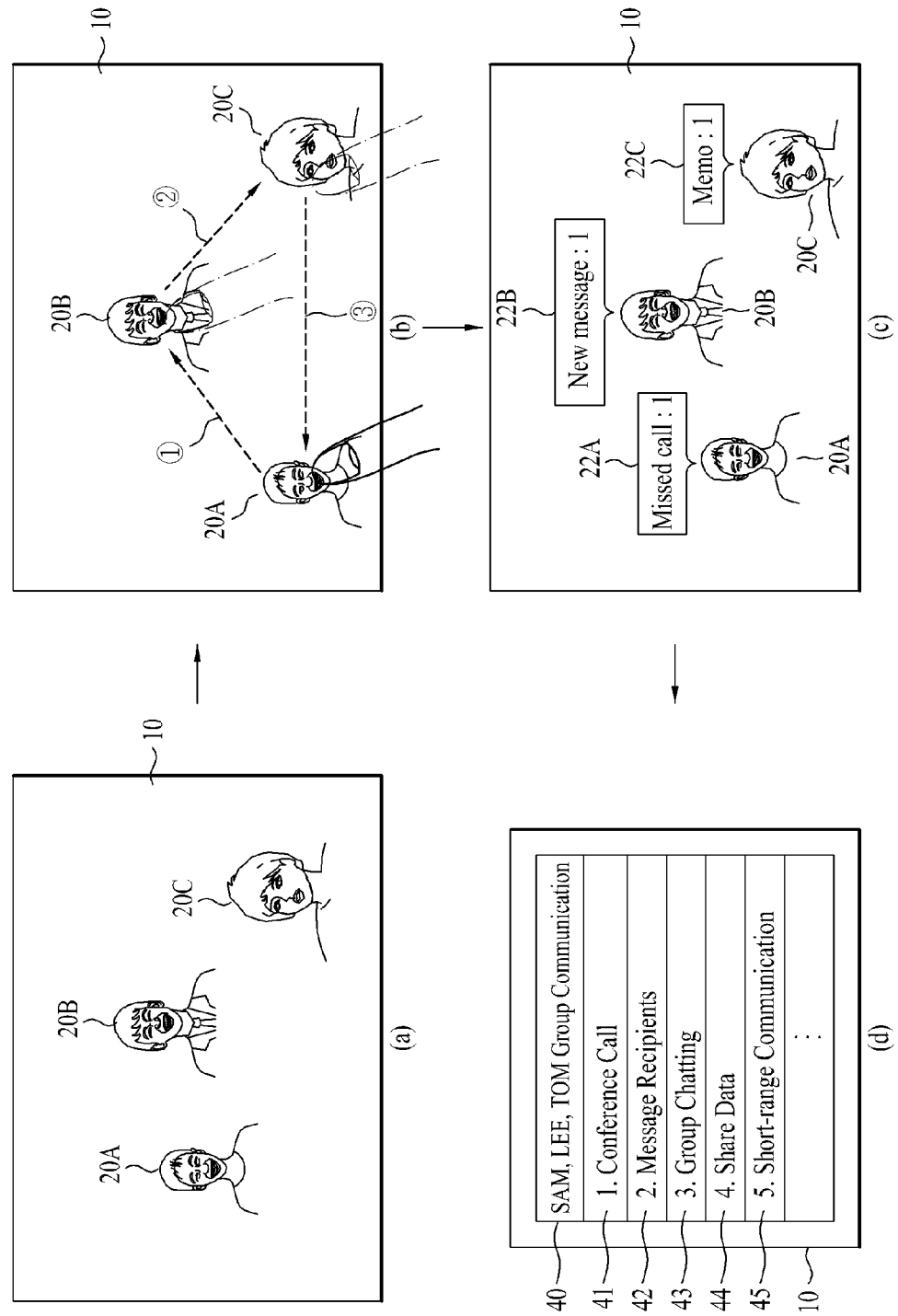

Referring to FIG. 15 (*a*) and FIG. 15 (*b*), if the first to third character pictures 20A, 20B and 20C in the image 10 are touched, the controller 180 searches of the contact information related to the first to third character pictures 20A, 20B and 20C and then checks whether an event related to each of the found contact informations has occurred.

In this case, the event can include one of a missed call, a received message, a memo, a schedule and the like.

As a result of the check, if the event related to each of the found contact informations has occurred, referring to FIG. 15 (*c*), the controller displays informations 22A, 22B and 22C respectively indicating the occurring events on the corresponding character pictures 20A, 20B and 20C, respectively. Subsequently, the controller 180 displays a menu list 40 shown in FIG. 15 (*d*).

In this case, for example, FIG. 15 (*c*) shows the following facts. First of all, a missed call 22A has occurred once according to the contact information corresponding to the first character picture 20A. Secondly, a message 22B has been received once according to the contact information corresponding to the second character picture 20B. Thirdly, there is a memo 22C related to the contact information corresponding to the third character picture 20C.

According to the above description with reference to FIGS. 7 to 15, in case that the mobile terminal 100 is in a single tasking mode for executing the display function of the image 10, group communications of various types are performed on the contacts respectively corresponding to character pictures using the character pictures included in the image 10.

In the following description a second embodiment with reference to FIGS. 16 to 27, in case that the mobile terminal 100 is in a multitasking mode for simultaneously executing both a display function of the image 10 and a different function selected by a user, group communications of various types are performed on contacts respectively corresponding to character pictures using the character pictures included in the image 10.

Figure 16:
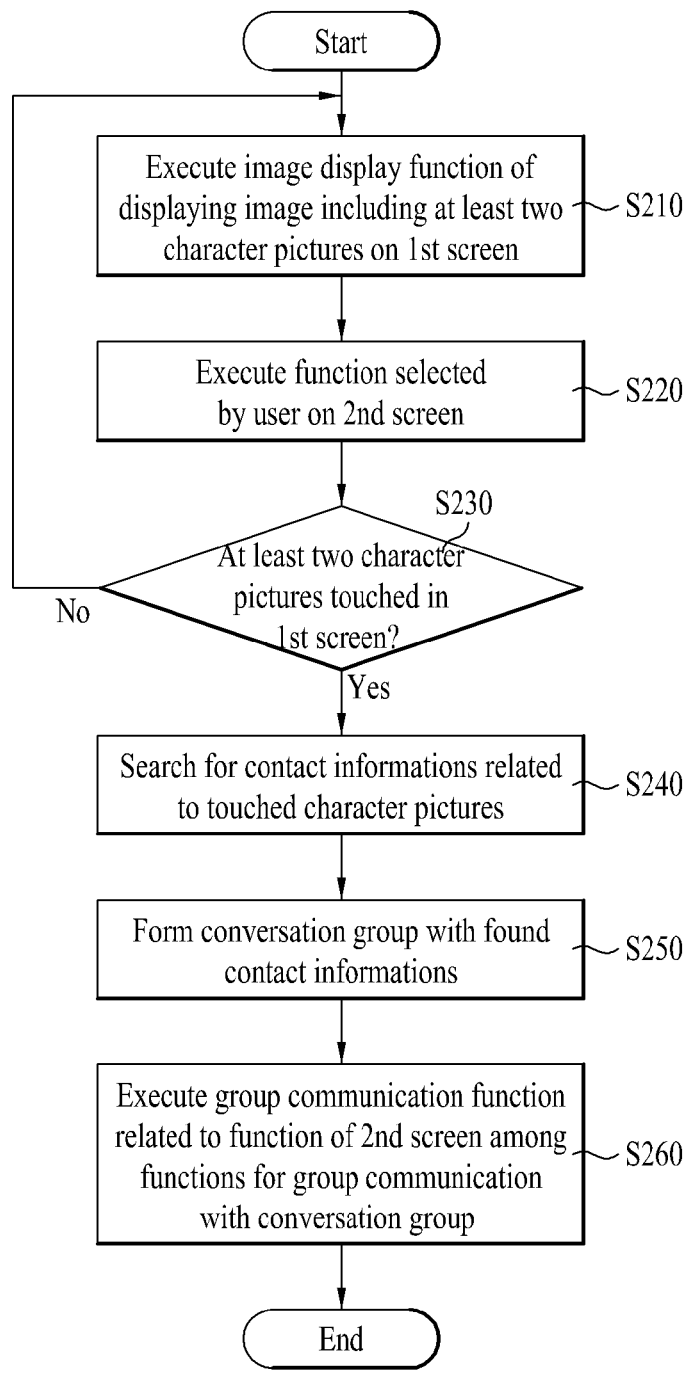
FIG. 16 is a flowchart of a process for performing a group communication on contact information corresponding to each character picture included in an image according to a second embodiment of the present invention.

FIG. 16 is a flowchart of a process for performing a group communication on contact information corresponding to each character picture included in an image according to a second embodiment of the present invention.

FIGS. 17 to 27 are diagrams of screen configurations of a process for performing group communication on contact information corresponding to each character picture included in an image according to a second embodiment of the present invention.

Referring to FIGS. 16 to 27, the controller 180 executes a display function of displaying an image including at least two or more character pictures 20A, 20B and 20C on a first screen 151A of the touchscreen 151 [S210] and also executes a function selected by a user on a second screen 151B [S220]. In doing so, if the at least two or more character pictures 20A, 20B and 20C are touched in the image 10 displayed on the first screen 151A [S230], the controller 180 searches the memory 160 for contact information respectively related to the touched character pictures 20A, 20B and 20C [S240] and then forms a conversation group with the found contact information [S250].

Figure 18:
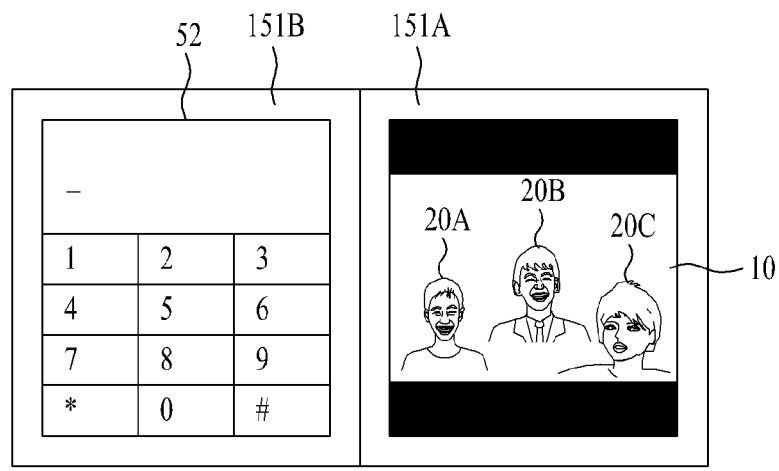
Figure 19:
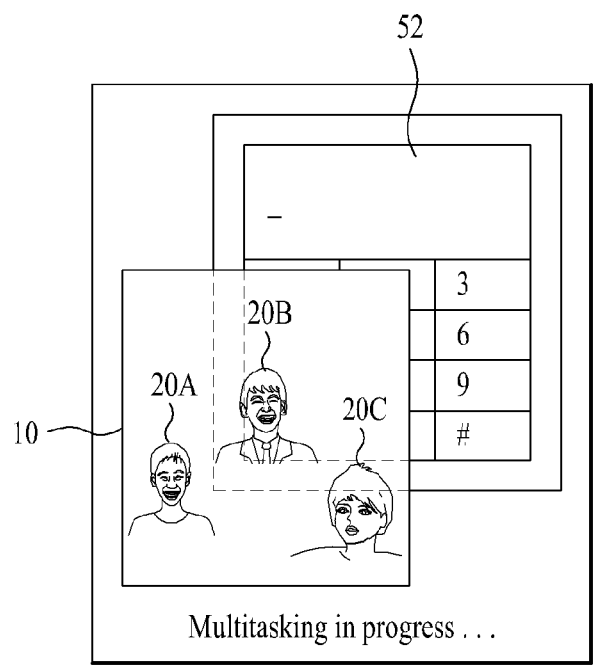

In this case, the functions executed on the first and second screens 151A and 151B are multitasked by the controller 180. And, the multitasking related screens can be displayed as shown in FIGS. 17 to 19.

Figure 17:
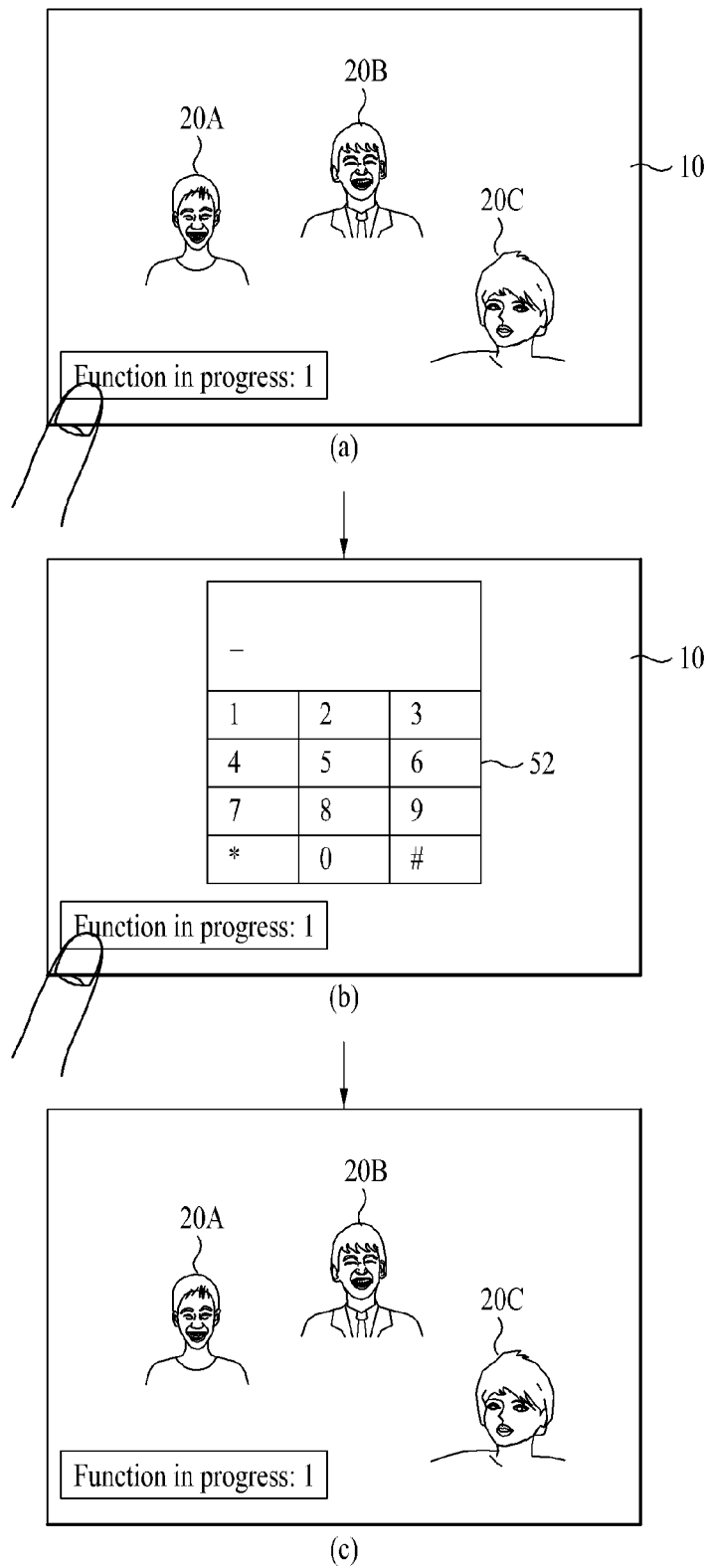

In particular, FIG. 17 shows that the multitasked image display function screen and the user-selected function executed screen are switched for each other on a screen of the touchscreen 151.

In more particular, FIG. 17 (a) shows that the image display function screen is first displayed on the screen of the touchscreen 151. If a command for the screen switching is inputted by a user, referring to FIG. 17 (b), the image display function screen is switched to an executed screen of the function 52 selected by the user.

Moreover, referring to FIG. 17 (c), after the image display function screen has been switched to the user-selected function executed screen, if the command for the screen switching is inputted again, the user-selected function executed screen is switched to the image display function screen.

Referring to FIG. 18, a screen of the touchscreen 151 is partitioned in to a first screen 151A and a second screen 151B. The image 10 is displayed on the first screen 151A and the user-selected function 52 is executed on the second screen 151B.

Referring to FIG. 19, a display function screen of the image 10 and an executed screen of the user-selected function 52 are displayed as new windows on the touchscreen 151, respectively.

In the following description, assume that the multitasking related screen is displayed as shown in FIG. 18, by which the multitasking related screen of the present invention is non-limited.

Meanwhile, if the conversation group is formed with the contact informations found in the step S250, the controller 180 executes a menu function related to a function of the second screen 151B among the menus for the group communication with the formed conversation group [S260].

In particular, the menus for the group communication can include at least one of an entry for a conference call to the found contact informations, an entry for sending a broadcast message, an entry for a group chatting, an entry for sharing the image, an entry for a short-range communication connection and the like.

For instance, referring to FIG. 20 (a), when the image 10 is displayed on the first screen 151A and a keypad 52 for a call connection is displayed as the user-selected function on the second screen 151B, if the first to third character pictures 20A, 20B and 20C in the image 10 are touched, the controller 180 searches the memory 160 for the contact informations related to the touched character pictures 20A, 20B and 20C.

Subsequently, referring to FIG. 20 (b), the controller executes a conference call connection function related to the keypad 52 on the second screen 151B among the entries for the group communication with the found contact information.

In particular, as the keypad 52 displayed on the second screen 151B is provided for the call connection, the controller 180 connects the conference call to the found contact informations by controlling the wireless communication unit 110.

Figure 21:
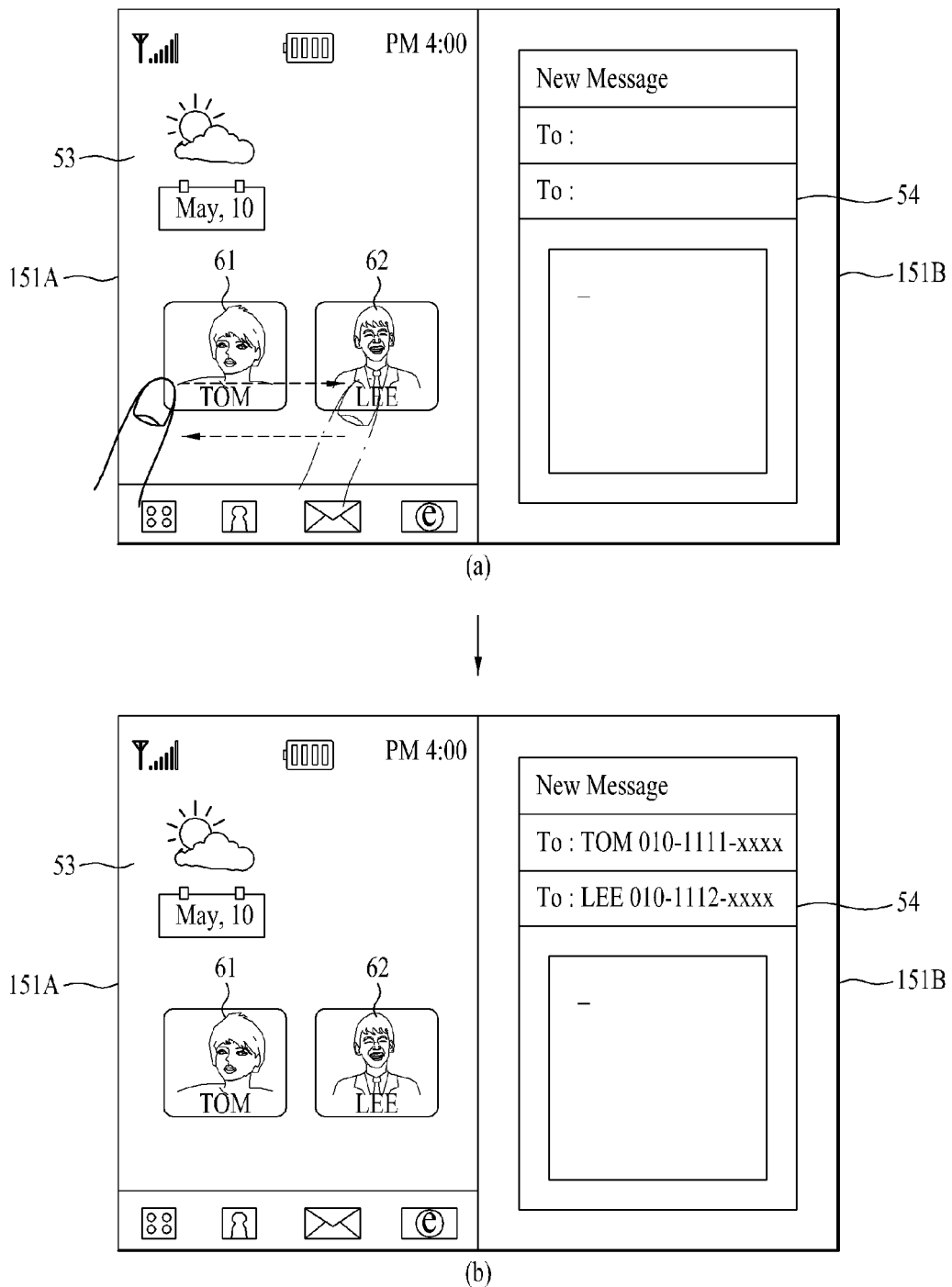

Referring to FIG. 21 (a), a standby screen 53, in which first and second character pictures 61 and 62 are included, is displayed on the first screen 151A. And, a message write window 54 is displayed as the user-selected function on the second screen 151B.

If the first and second character pictures 61 and 62 in the standby screen 53 are touched, the controller 180 searches the memory 160 for the contact informations related to the touched first and second character pictures 61 and 62 and then sets recipients to the found contact informations in the message write window 54 [FIG. 21 (b)].

Figure 22:
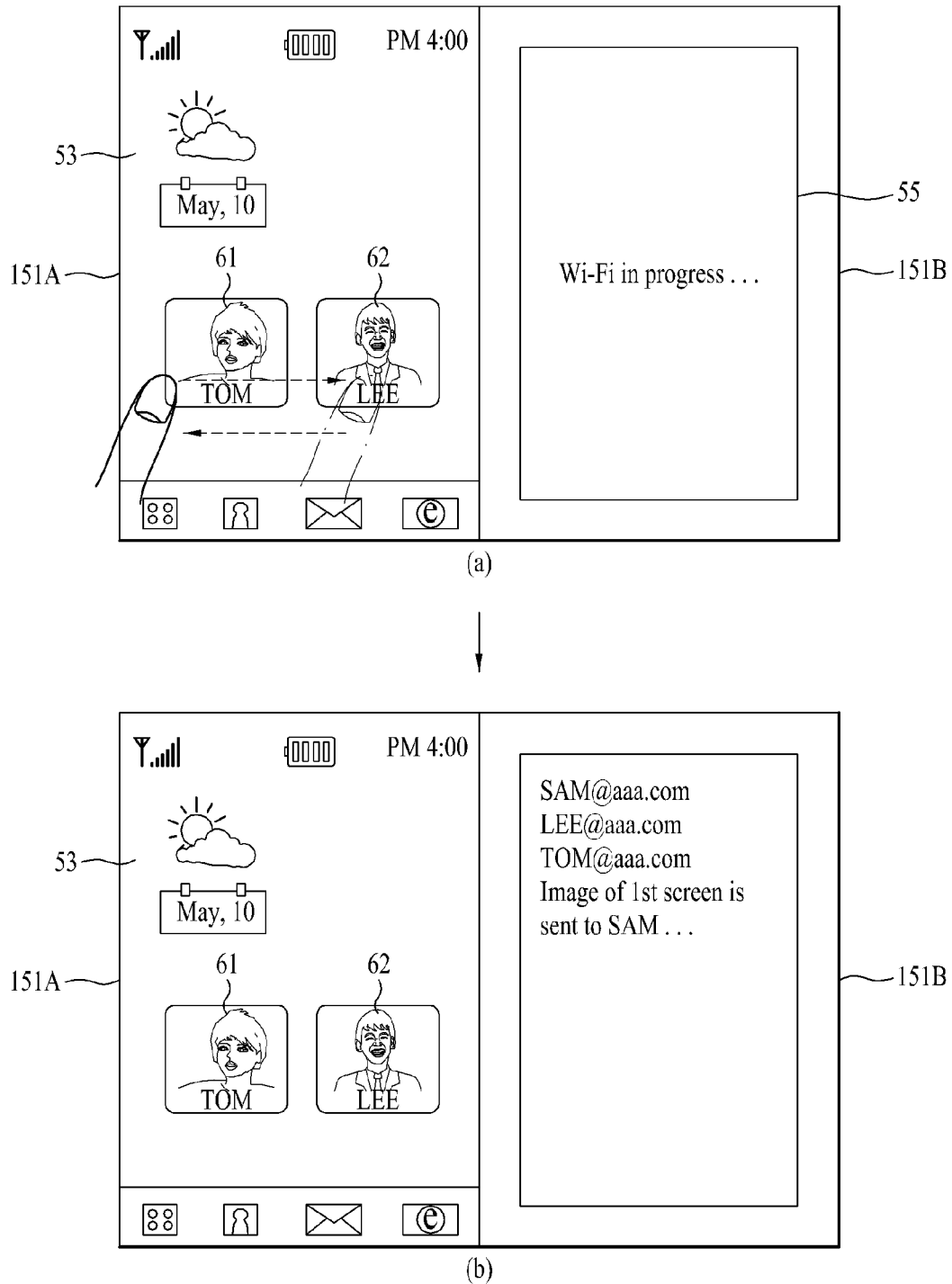

Referring to FIG. 22 (a), a standby screen 53, in which first and second character pictures 61 and 62 are included, is displayed on the first screen 151A. And, a wireless internet function 55 is executed as the user-selected function on the second screen 151B.

If the first and second character pictures 61 and 62 in the standby screen 53 are touched, the controller 180 searches the memory 160 for the contact informations related to the touched first and second character pictures 61 and 62 and then transmits an image of the first screen 151A to the found contact informations by controlling the wireless communication unit 110 [FIG. 22 (b)].

Figure 23:
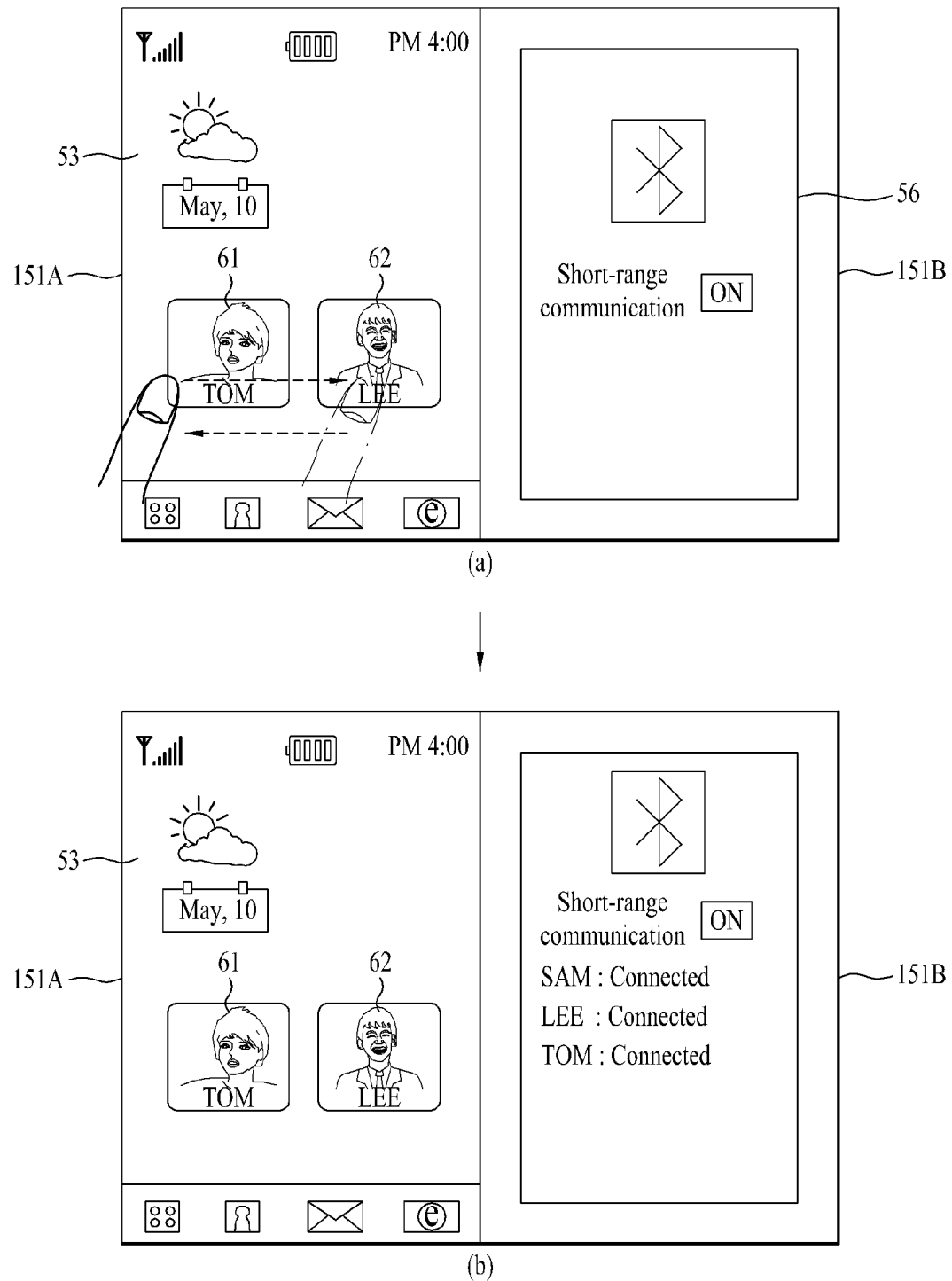

Referring to FIG. 23 (a), a standby screen 53, in which first and second character pictures 61 and 62 are included, is displayed on the first screen 151A. And, a short-range communication connecting function 56 is executed on the second screen 151B.

If the first and second character pictures 61 and 62 in the standby screen 53 are touched, the controller 180 searches the memory 160 for the contact informations related to the touched first and second character pictures 61 and 62 and then connects the short-range communication with the found contact informations by controlling the wireless communication unit 110 [FIG. 23 (b)].

Figure 24:
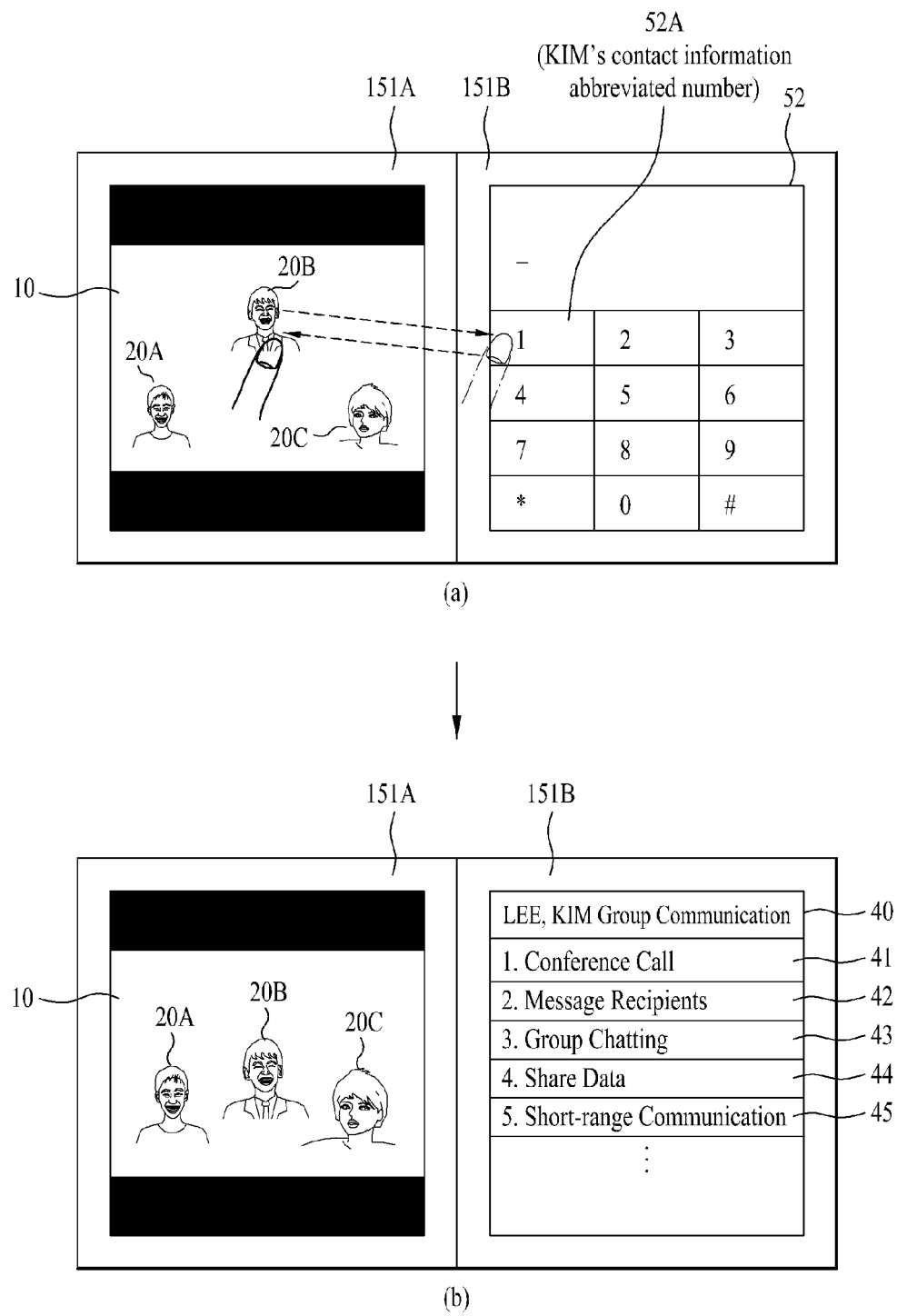

Referring to FIG. 24 (a), an image including first to third character pictures 20A, 20B and 20C is displayed on the first screen 151A. And, a keypad 52 having a shortcut call number set therein is displayed on the second screen 151B.

In this case, a numeral key '1' 52A of the keypad 52 is set to a contact information on KIM. If the second character picture 20B in the image 10 and the key '1' 52A of the keypad 52 are touched, the controller 180 searches the memory 160 for the contact information related to the touched second character picture 20B and the contact information on KIM set in the key '1' 52A and then displays a menu list 40 for performing a group communication function execution on the found contact information (LEE) related to the second character picture 20B and the contact information on KIM set in the key '1' 52A [FIG. 24 (b)].

Figure 25:
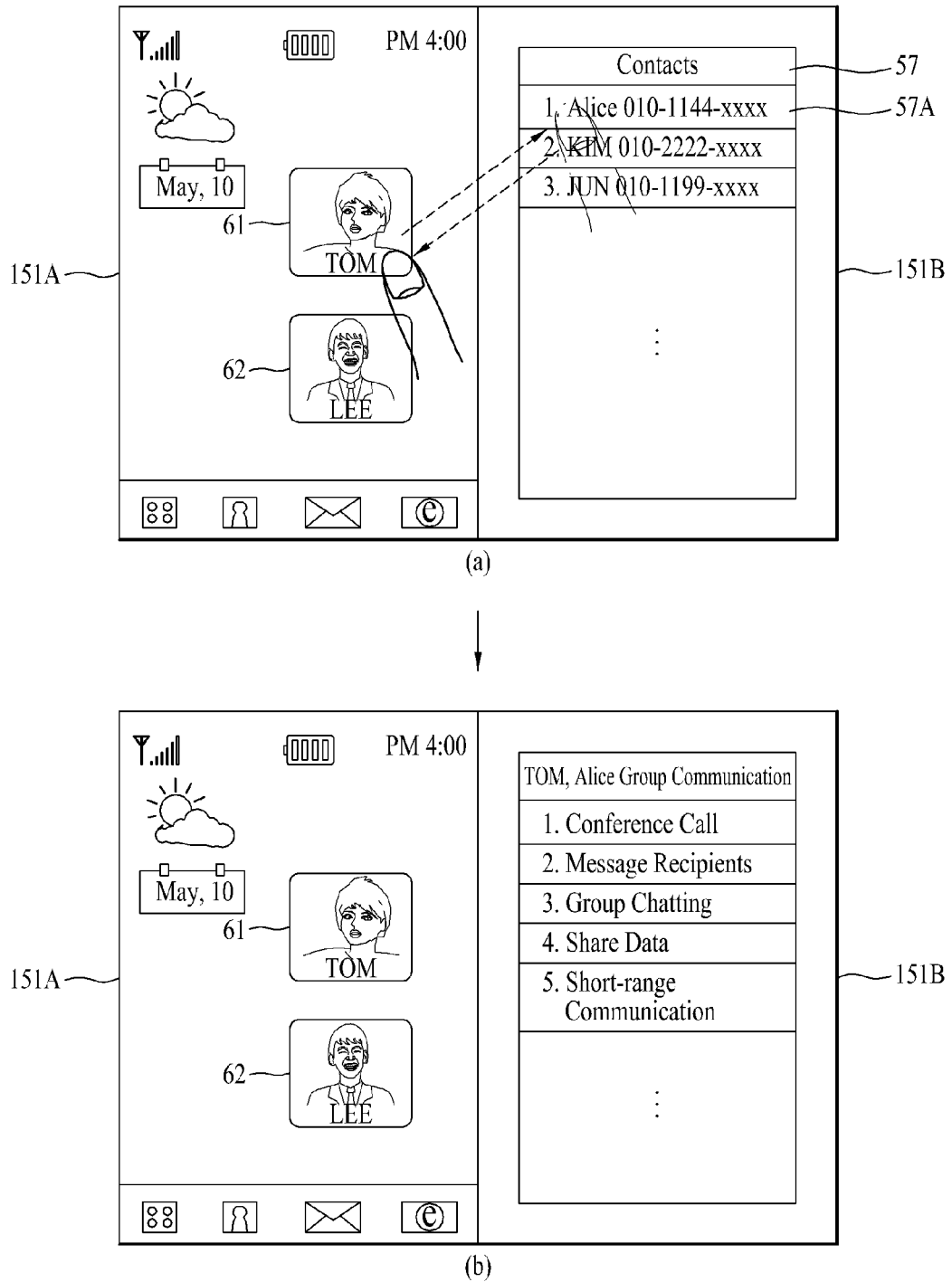

Referring to FIG. 25 (a), a standby screen including first and second character pictures 61 and 62 is displayed on the first screen 151A. And, a contact information list 57 is displayed as the user-selected function on the second screen 151B.

In this case, if the first character picture 61 in the image 10 and a specific contact information on Alice 57A in the contact information list 57 are touched, the controller 180 searches the memory 160 for the contact information on TOM related to the touched first character picture 61 and then displays a menu list 40 for performing a group communication function execution on the contact information on TOM related to the found first character picture 61 and the specific contact information on Alice 57A [FIG. 25 (*b*)].

Referring to FIG. 26 (*a*), an image 10 including first to third character pictures 20A, 20B and 20C is displayed on the first screen 151A. And, a contents list 58 is displayed as the user-selected function on the second screen 151B.

If the second and third character pictures 20B and 20C in the image 10 and a specific content (Memo.txt) 58A in the contents list 58 are touched, the controller 180 searches the memory 160 for contact informations LEE and TOM related to the touched second and third character pictures 20B and 20C and then transmits the touched specific content (Memo.txt) 58A to the found contact informations LEE and TOM related to the touched second and third character pictures 20B and 20C by controlling the wireless communication unit 110 [FIG. 26 (*b*)].

Referring to FIG. 27 (*a*), an image 10 including first to third character pictures 20A, 20B and 20C is displayed on the first screen 151A. And, a contents list 58 is displayed as the user-selected function on the second screen 151B.

If the second and third character pictures 20B and 20C in the image 10 and a specific content (Memo.txt) 58A in the contents list 58 are touched, the controller 180 searches the memory 160 for contact informations LEE and TOM related to the touched second and third character pictures 20B and 20C and then shares the touched specific content (Memo.txt) 58A with the found contact informations LEE and TOM related to the touched second and third character pictures 20B and 20C by controlling the wireless communication unit 110 [FIG. 27 (*b*)].

In the above description, so far, the first aspect of the present invention is explained in detail with reference to FIGS. 3 to 27.

In the following description, a second aspect of the present invention is explained in detail with reference to FIGS. 28 to 37.

[Second Aspect]

A second aspect of the present invention relates to a following process. First of all, message contents transceived with counterpart terminals belonging to the conversation group formed by the former process shown in FIGS. 3 to 27 are grouped into one. Secondly, the grouped message contents are consecutively displayed on a single screen.

A second aspect of the present invention is explained in detail with reference to FIGS. 28 to 37 as follows.

First of all, as mentioned in the foregoing description, a conversation group of a second aspect of the present invention can be formed by the first aspect shown in FIGS. 3 to 27.

Secondly, a conversation group of a second aspect of the present invention can be formed with at least two contact information selected from a phonebook as shown in FIGS. 28 to 32. Alternatively, a conversation group of a second aspect of the present invention can be formed with at least two contact informations selected from a recent communication list. Alternatively, a conversation group of a second aspect of the present invention can be formed with contact information corresponding to at least two abbreviated dial icons selected from a standby screen.

A conversation group forming process according to a second aspect of the present invention is explained in detail with reference to FIGS. 28 to 32 as follows.

Figure 28:
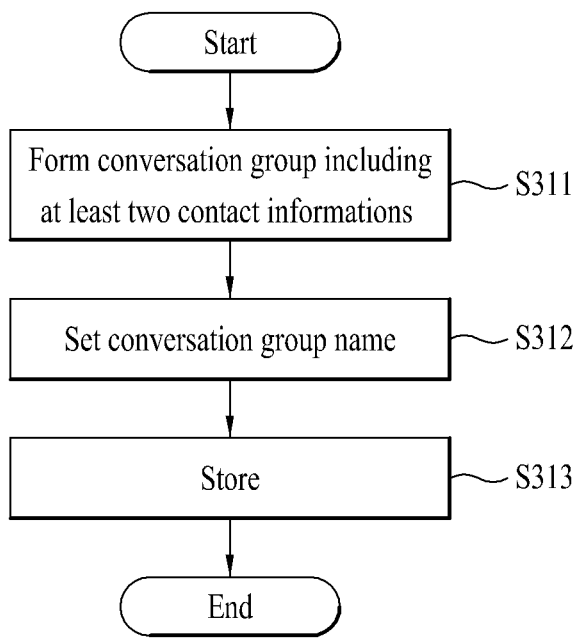
FIG. 28 is a flowchart of a process for forming a conversation group according to a second aspect of the present invention.

FIG. 28 is a flowchart of a process for forming a conversation group according to a second aspect of the present invention.

FIGS. 29 to 32 are diagrams of screen configurations of a process for forming a conversation group according to a second aspect of the present invention.

Referring to FIG. 28, after at least one conversation group including at least two contact informations is formed in the mobile terminal 100 via the user input unit 130 or the touchscreen 151 [S311], if a conversation group name of the formed conversation group is set [S312], the controller 180 controls the formed conversation group and the name of the conversation group to be stored in the memory 160 [S313].

For instance, by the process described in detail with reference to FIGS. 3 to 27, the controller 180 searches an image 10 including at least two character pictures for contact information respectively corresponding to the character pictures and is then able to form a conversation group with the found contact information.

For another instance, if at least two contact informations are selected from a phonebook provided to the memory 160 by a user, the controller 180 is able to form a conversation group with the selected contact informations.

For another instance, if at least two contact informations are selected from a recent communication list by a user, the controller 180 is able to form a conversation group with the selected contact informations.

In this case, the recent communication list means a list constructed with contact information of counterpart terminals, which are updated each outgoing/incoming call, and can be named one of a recent call list, a recent call history and the like.

For another instance, if at least two abbreviated dial icons are selected from abbreviated dial icons displayed on the screen by a user, the controller 180 is able to form a conversation group with contact informations respectively mapped to the selected abbreviated dial icons. In this case, the abbreviated dial icon means a specific icon to which a contact information of a counterpart is mapped. Generally, a picture of a counterpart designated by a user is displayed within the abbreviated dial icon.

Moreover, if a user selects the abbreviated dial icon, a sub-icon for a call connection and a sub-icon for a message transmission are displayed around the corresponding abbreviated dial icon. Therefore, the user is facilitated to perform a call and/or a message transmission by manipulating the sub-icons displayed around the abbreviated dial icon.

Figure 29:
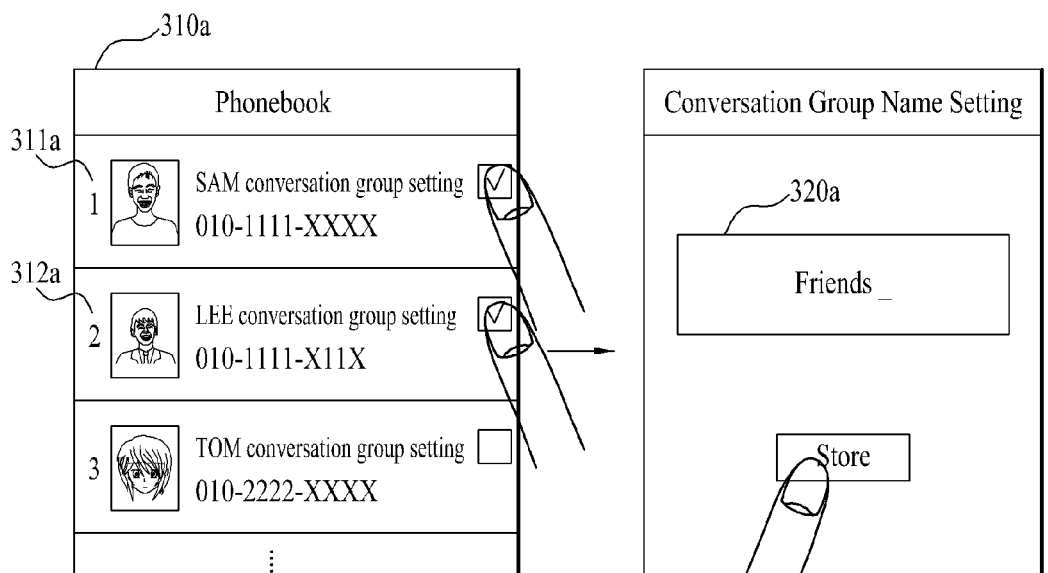

FIG. 29 exemplarily shows an example of a process for forming a conversation group using a phonebook.

Referring to FIG. 29 (*a*), a contact information '1. SAM' 311*a* and a contact information '2. LEE' 312*a* and a contact information '3. TOM' are displayed in a phonebook 310*a*.

If a user selects the contact information '1. SAM' 311*a* and the contact information '2. LEE' from the phonebook 310*a* [FIG. 29 (*a*)], the controller 180 forms a conversation group with counterpart terminals corresponding to the contact informations 311*a* and 312*a* selected by the user and then displays a conversation group name input window 320*a* for setting a name of the formed conversation group [FIG. 29 (*b*)].

If a conversation group name 'Friends' is inputted by a user via the conversation group name input window 320*a*, referring to FIG. 29 (c), the controller 180 forms a conversation group having a name 'Friends' with counterpart terminals respectively corresponding to the selected contact information '1. SAM' 311a and the selected contact information '2. LEE'.

Figure 30:
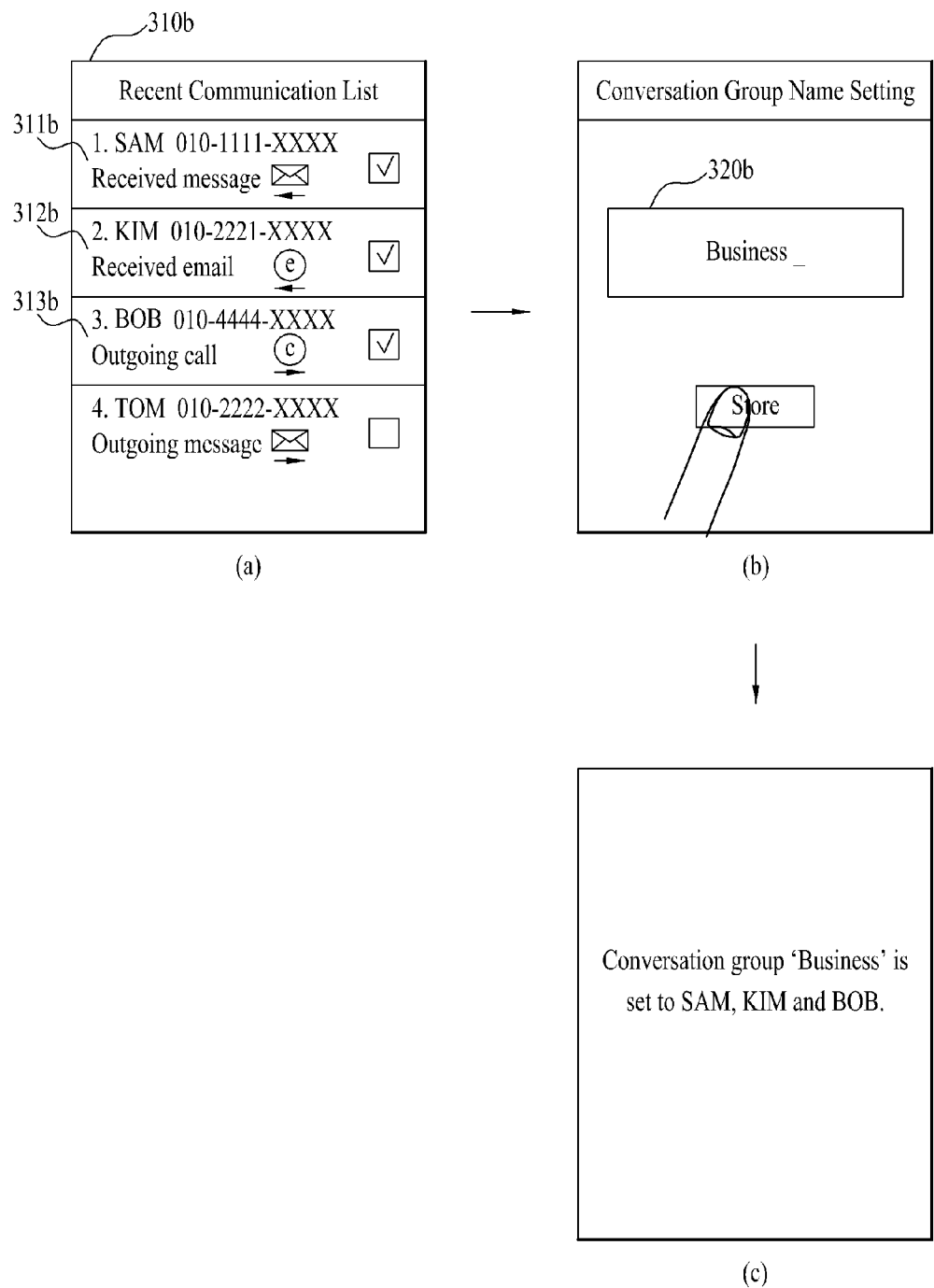

FIG. 30 exemplarily shows an example of a process for forming a conversation group using a recent communication list.

Referring to FIG. 30 (a), a contact information '1. SAM' 311b, a contact information '2. KIM' 312b, a contact information '3. BOB' 313b and a contact information '4. TOM' are displayed within a recent communication list 310b.

If a user selects the contact information '1. SAM' 311b, the contact information '2. KIM' 312b and the contact information '3. BOB' 313b from the recent communication list 310b [FIG. 30 (a)], the controller 180 forms a conversation group with counterpart terminals respectively corresponding to the contact informations 311b, 312b and 313b selected by the user and then displays a conversation group name input window 320b for setting a name of the formed conversation group [FIG. 30 (b)].

If a conversation group name 'Business' is inputted by a user via the conversation group name input window 320b, the controller 180 forms a conversation group having the name 'Business' with counterpart terminals respectively corresponding to the selected contact information '1. SAM' 311b, the selected contact information '2. KIM' 312b and the selected information '3. BOB' 313b [FIG. 30 (c)].

Figure 31:
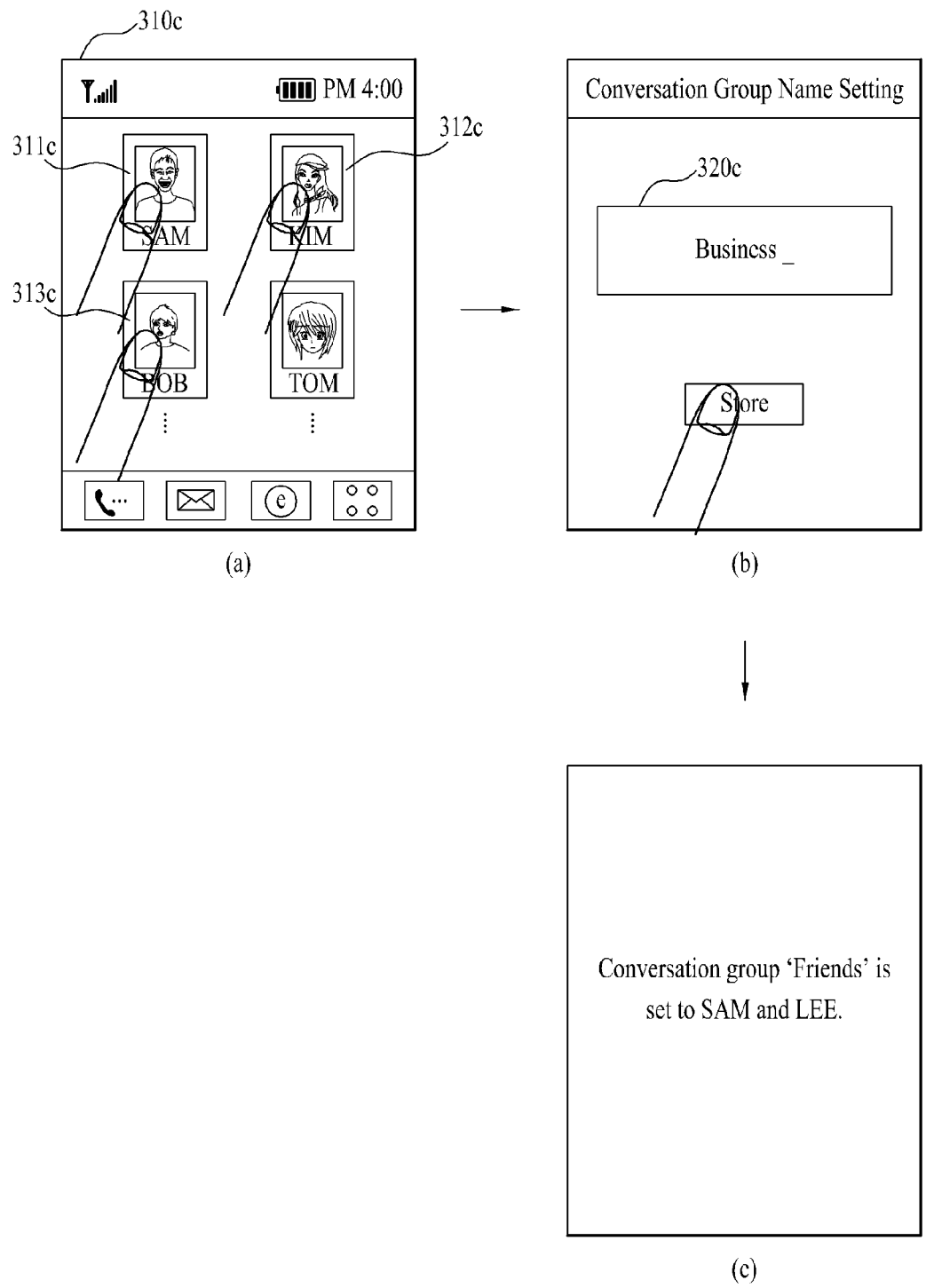

FIG. 31 exemplarily shows an example of a process for forming a conversation group using an abbreviated dial icon.

Referring to FIG. 31 (a), an abbreviated dial icon '1. SAM' 311c, an abbreviated dial icon '2. KIM' 312c, an abbreviated dial icon '3. BOB' 313c and an abbreviated dial icon '4. TOM' are displayed on a standby screen 310c of the mobile terminal 100.

If a user selects the abbreviated dial icon '1. SAM' 311c, the abbreviated dial icon '2. KIM' 312c and the abbreviated dial icon '3. BOB' 313c from the standby screen 310c [FIG. 31 (a)], the controller 180 forms a conversation group with counterpart terminals respectively corresponding to the abbreviated dial icons 311c, 312c and 313c selected by the user and then displays a conversation group name input window 320c for setting a name of the formed conversation group [FIG. 31 (b)].

If a conversation group name 'Business' is inputted by a user via the conversation group name input window 320c, the controller 180 forms a conversation group having the name 'Business' with counterpart terminals respectively corresponding to the selected abbreviated dial icon '1. SAM' 311c, the selected abbreviated dial icon '2. KIM' 312c and the selected abbreviated dial icon '3. BOB' 313c [FIG. 31 (c)].

In this case, if the conversation group is formed with the at least two contact informations by the process described with reference to FIGS. 3 to 27 or the process described with reference to FIGS. 28 to 31, referring to FIG. 32 (a), the controller 180 generates a first storage box UI (user interface) 330 for grouping transceived messages related to the formed conversation group into a single file and storing the single file.

In doing so, referring to FIG. 32 (a), the controller generates and displays the first storage box UI 330 within the standby screen. Alternatively, the controller 180 adds a menu corresponding to the first storage box UI 330 to a message related menu and then displays the added menu, according to a user's setting.

In case that at least two conversation groups including a first conversation group and a second conversation group, to which at least two contact informations belong, are formed by the process described with reference to FIGS. 28 to 31, referring to FIG. 32 (b), the controller 180 generates a first storage box UI 330 and a second storage box UI 340 to store the transceived messages in a manner of grouping the transceived messages into a file related to the first conversation group and a file related to the second conversation group.

In the above description, the conversation group forming process for displaying the message transceiving contents of a conversation window type on a single screen according to the second aspect of the present invention is explained in detail with reference to FIGS. 28 to 32.

In the following description, a process for grouping message contents transceived with counterpart terminals belonging to a conversation group into one and displaying the grouped one on a single screen according to a second aspect of the present invention is explained with reference to FIGS. 33 to 37.

Figure 33:
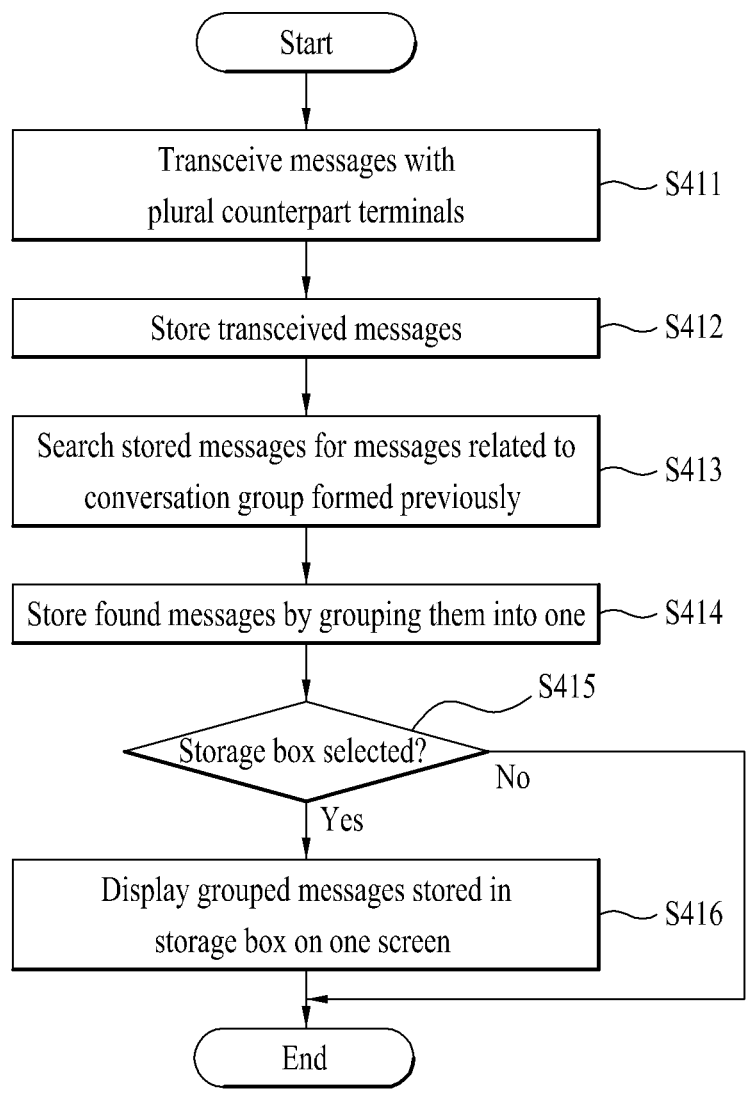
FIG. 33 is a flowchart of a process for grouping message contents transceived with counterpart terminals belonging to a conversation group into one and displaying the grouped one on a single screen according to a second aspect of the present invention.

FIG. 33 is a flowchart of a process for grouping message contents transceived with counterpart terminals belonging to a conversation group into one and displaying the grouped one on a single screen according to a second aspect of the present invention.

FIGS. 34 to 37 are diagrams of screen configurations of a process for grouping message contents transceived with counterpart terminals belonging to a conversation group into one and displaying the grouped one on a single screen according to a second aspect of the present invention.

Referring to FIG. 33, if messages are transceived with a plurality of counterpart terminals via the wireless communication unit 110 [S411], the controller controls the transceived messages to be stored in the memory [S412].

In this case, the messages stored in the memory 160 can include messages of the same type or messages of different types. In particular, the messages can include messages of at least one type of SMS (short message service), MMS (multimedia message service), email, SNS (social network service) and the like.

Subsequently, the controller 180 searches the messages stored in the memory 160 for at least one or more messages related to the counterpart terminals belonging to the conversation group formed by the process described with reference to FIGS. 3 to 27 or the process described with reference to FIGS. 28 to 31 [S413] and then stores the found messages in a storage box UI of the corresponding conversation group in a manner of grouping the found messages into one [S414].

In doing so, the controller 180 unifies the found messages into a single file and then stores the single file in the storage box UI of the corresponding conversation group. In particular, before unifying the found messages into a single file, the controller 180 sorts the found messages in order of message transceived hour, per type of each of the found messages or per priority preset by a user. The controller 180 is then able to unify the sorted messages into a single file.

Moreover, after unifying the contents of the found messages into one, the controller 180 is able to store the unified contents of the messages in a storage box UI of a corresponding conversation group. In particular, before unifying the contents of the found messages into one, the controller 180 sorts the found messages in order of message transceived hour, per type of each of the found messages or per priority preset by a user. The controller 180 is then able to unify the contents of the sorted messages into one.

For instance, FIG. 34 (a) shows a process for sorting the found messages in order of transceived hours. Referring to FIG. 34 (a), the controller 180 searches the messages stored in the memory 160 for four messages 411 to 414 related to the conversation group and then sorts the found messages 411 to 414 in chronological order.

For instance, FIG. 34 (b) shows a process for sorting the found messages per type. Referring to FIG. 34 (b), the controller 180 searches the messages stored in the memory 160 for four messages 411 to 414 related to the conversation group and then sorts the found messages 411 to 414 per type.

Meanwhile, the controller 180 extracts a content of each of the found messages and is then able to control the extracted contents as an image file to be stored in the memory 160 by grouping the extracted contents into one.

Alternatively, the controller 180 groups the extracted contents into one and then stores the grouped one as a file corresponding to a type of the message sent by a user or a file corresponding to a message type supported by each of the counterpart terminals belonging to the conversation group.

Thus, each time the messages transceived via the wireless communication unit 110 are stored in the memory 160, the controller 180 periodically searches the memory 160 for the messages related to the conversation group, groups the found messages, and then stores the grouped messages.

In case that the conversation group is set to at least two conversation groups including a first conversation group and a second conversation group, the controller 160 classifies the messages into the messages related to the first conversation group and the messages related to the second conversation group in the memory 160, groups the messages separately, and then stores the grouped messages separately.

Besides, the storage box UI, in which the grouped message contents are stored, can be displayed as an icon on a standby screen of the mobile terminal 100 [cf. FIG. 32] or can be generated as a menu type for storing the unified message contents within a message related menu.

In this case, the standby screen means a screen, on which an indicator icon indicating a status of the mobile terminal 100 and an image set by a user are displayed, when a screen of the mobile terminal 100 is driven.

According to a user's setting, the controller 180 checks a counterpart terminal having no group communication with the mobile terminal 100 for a preset duration among counterpart terminals belonging to the conversation group and enables the checked counterpart terminal to withdraw from the corresponding conversation group.

In particular, the controller 180 checks a counterpart terminal having no message transaction with the mobile terminal 100 for a preset duration among counterpart terminals belonging to the conversation group and enables the checked counterpart terminal to withdraw from the corresponding conversation group.

While the grouped messages are stored in the storage box UI of the corresponding conversation group, if the storage box UI is selected or a command for reading the grouped messages stored in the storage box UI is inputted [S415], the controller 180 controls the contents of the grouped messages stored in the storage box UI to be displayed on one screen of the display unit 180 [S416]. In this case, the screen having the grouped message contents displayed thereon can include a standby screen or a message related menu screen.

The controller 180 is able to control the contents of the grouped messages stored in the storage box to be displayed as a conversation window or a messenger on one screen.

Moreover, while the grouped messages are stored in the storage box UI of the corresponding conversation group, if the storage box UI is selected or a command for transmitting the contents of the grouped messages stored in the storage box UI to the counterpart terminals belonging to the conversation group is inputted, the controller 180 generates a file of the contents of the grouped messages stored in the storage box UI and is then able to transmit the file to the conversation group [Not shown in FIG. 33].

For instance, FIG. 35 (a) shows that four message contents related to the conversation group 'Business' are grouped and stored in the storage box UI 340 on a stand-by screen.

If the storage box UI 340 is selected [FIG. 35 (a), the controller 180 is able to display a first menu 341 for reading the contents of the grouped messages stored in the storage box UI 340 and a second menu 342 for transmitting the contents of the grouped messages to the conversation group [FIG. 35 (b)].

Figure 36:
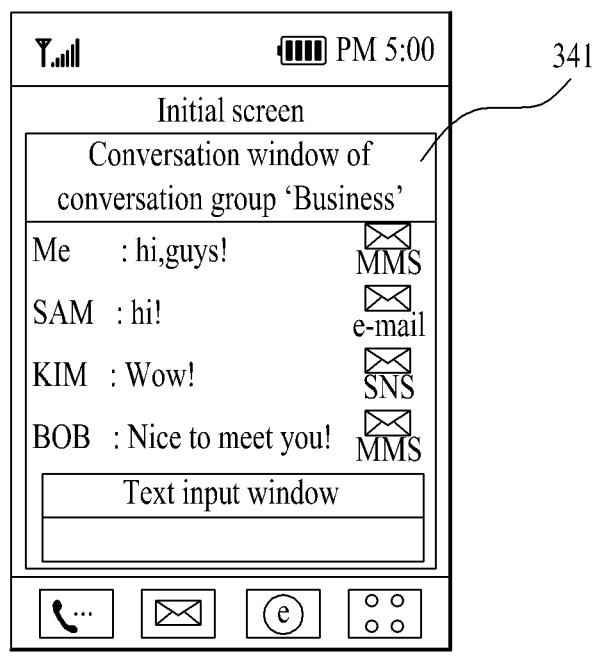

In this case, if a user selects the first menu 341, referring to FIG. 36, the controller 180 is able to display the contents of the grouped messages stored in the storage box UI 340 as a conversation window.

In particular, the conversation window can include a first region for displaying information indicating names of the counterpart terminals belonging to the conversation group or a message type supported by each of the counterpart terminals, a second display region for displaying contents of the grouped messages, and a third display region for displaying a text input window for inputting a text to transmit to each of the counterpart terminals.

Optionally, a UI for performing a function of deleting the conversation group, a UI for performing a function of deleting a counterpart terminal from the conversation group, a UI for performing a function of adding a new counterpart terminal to the conversation group, a UI for performing a function of modifying the conversation group name, a UI for performing a function of modifying a name of a counterpart terminal belonging to the conversation group and the like can be further displayed on the conversation window.

If a name of a specific counterpart terminal is selected from the conversation window, the controller 180 searches the memory 160 for all messages related to the selected counterpart terminal, generates a list of the found messages, and then displays the generated list.

While the conversation window is displayed, if a message is received from a specific counterpart terminal belonging to the conversation group via the wireless communication unit 110, the controller displays the received message content in a manner of updating the received message content into the contents of the grouped messages in the conversation window.

If the conversation window is displayed, in order for the counterpart terminals belonging to the conversation group to be displayed in the same manner of the conversation window, the controller 180 is able to transmit display style information of the conversation window to the conversation group via the wireless communication unit 110.

After a message content has been inputted via the text input window, if a name of a specific counterpart terminal or information indicating a message type supported by the specific counterpart terminal is selected, the controller 180 transmits the inputted message content to the specific counterpart terminal and then displays the transmitted message content by updating the transmitted message content to the contents of the grouped messages within the conversation window.

Figure 37:
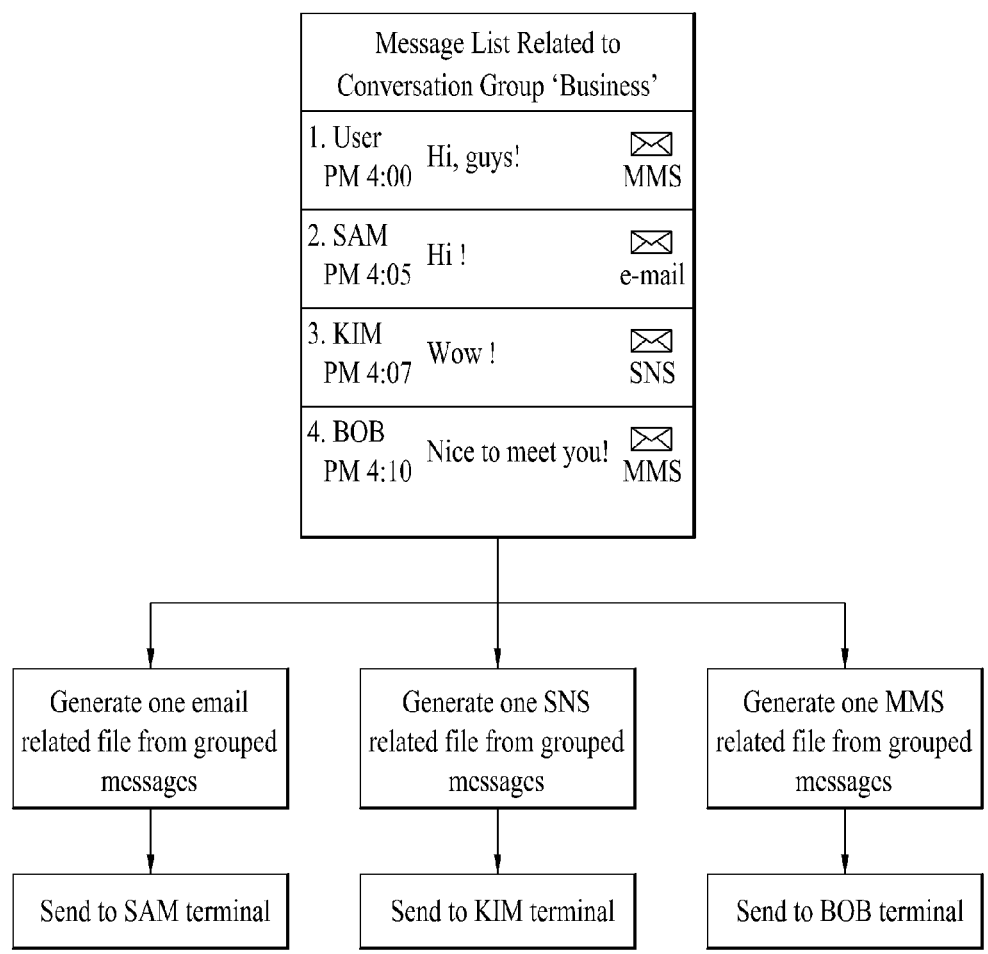

If the second menu 342 is selected in FIG. 35 (b), referring to FIG. 37, the controller converts the contents of the grouped messages to a file of a message type supported by each counterpart terminal belonging to the conversation group and then transmits the corresponding file.

If a name of a specific counterpart terminal is selected from the conversation window, the controller converts the contents of the grouped messages to a file of a message type supported by the selected specific counterpart terminal and then transmits the corresponding file to that terminal.

As mentioned in the foregoing description, according to the second aspect of the present invention, the display style information of the conversation window and the contents of the grouped messages displayed within the conversation window are transmitted to the counterpart terminal belonging to the conversation group to enable the counterpart terminal to display a conversation window of the same type as the former conversation window displayed in the mobile terminal 100. Therefore, a group communication of a messenger type can be performed between a user and a counterpart.

Accordingly, the present invention provides the following effects and/or advantages.

First of all, the present invention forms a conversation group with at least two counterpart terminals using an image including at least two character pictures, thereby performing group communications of various types on the conversation group.

Secondly, the present invention groups contents of message exchanges with counterpart terminals belonging to a conversation group into one and then displays the grouped one on a single screen consecutively. Therefore, a user can be provided with a message communication function as if having a chat with the counterpart terminals belonging to the conversation group.

It will be apparent to those skilled in the art that various modifications and variations can be specified into other form(s) without departing from the spirit or scope of the inventions.

In addition, the above-described methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet). And, the computer can include the controller 180 of the terminal.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal, comprising:
    a touchscreen configured to display an image including at least two character pictures;
    a memory configured to store contact information respectively related to the at least two character pictures;
    a wireless communication unit configured to communicate with counterpart terminals corresponding to the contact information; and
    a controller configured to:
    when at least two character pictures are touched on the image, search the memory for the contact information respectively related to the at least two character pictures touched on the image;
    form a conversation group with the searched contact information;
    control the wireless communication unit to perform group communication with the conversation group;
    search for messages transceived with counterpart terminals belonging to the conversation group via the group communication with the conversation group;
    unify the searched messages into a single file;
    convert the single file to a file corresponding to a message type supported by each of the counterpart terminals belonging to the conversation group; and
    control the wireless communication unit to transmit the converted file to the counterpart terminals belonging to the conversation group.

2. The mobile terminal of claim 1, wherein the controller is configured to periodically search for messages transceived with the counterpart terminals belonging to the conversation group, to group the searched messages and then control the grouped messages to be stored in the memory.

3. The mobile terminal of claim 1, wherein the controller is configured to group the searched messages in a manner of sorting the searched messages in chronological order.

4. The mobile terminal of claim 1, wherein the controller is configured to group the searched messages by message type.

5. The mobile terminal of claim 2, wherein the controller is configured to display a UI (user interface) for storing the grouped messages on a standby screen of the touchscreen and then control the grouped messages to be stored in the UI.

6. The mobile terminal of claim 2, wherein the controller is configured to control the grouped messages to be stored as a message file and then transmit the stored message file to the conversation group.

7. The mobile terminal of claim 1, wherein after the conversation group has been set, the controller is configured to check whether group communication with the contact information belonging to the conversation group is performed and delete any contact information failing to have group communication for a preset duration from the conversation group.

8. The mobile terminal of claim 1, wherein the contact information is mapped to display positions of the character pictures in the image.

9. The mobile terminal of claim 1, wherein the controller is configured to display at least one menu for the group communication with the conversation group and wherein when a menu entry is selected, the controller is configured to perform the group communication assigned to the selected menu entry.

10. The mobile terminal of claim 1, wherein the controller is configured to control a name previously registered with each of the searched contact information to be displayed at a position of the corresponding character picture in the image.

11. The mobile terminal of claim 1, wherein the controller is configured to control a number of the searched contact information to be displayed in the image.

12. The mobile terminal of claim 1, wherein before the character pictures are touched on the image, the controller is configured to emphasize the searched character pictures.

13. The mobile terminal of claim 1, wherein if an event related to at least one of the searched contact information occurs, the controller is configured to indicate an occurring event to be displayed on the corresponding character picture.

14. The mobile terminal of claim 1, wherein the touchscreen includes a first screen having the conversation group set thereon; and
    a second screen on which a function previously selected by a user is executed,
    wherein the first and second screens are multitasked, and
    wherein the controller is configured to execute a group communication function related to a function of the second screen among group communication functions of communicating with the conversation group on the first screen.

15. The mobile terminal of claim 14, wherein the function of the second screen includes a call connection function, and
wherein the controller is configured to control the wireless communication unit to connect a conference call to the conversation group.

16. The mobile terminal of claim 14, wherein the function of the second screen includes a message write function of writing a message, and
wherein the controller is configured to set a recipient of the message to the conversation group.

17. The mobile terminal of claim 14, wherein the function of the second screen includes a content executing function of executing a content, and
wherein the controller is configured to control the wireless communication unit to transmit the content to the conversation group.

18. The mobile terminal of claim 14, wherein the function of the second screen includes a short-range communication connecting function of connecting a short-range communication, and
wherein the controller is configured to control the wireless communication unit to connect the short-range communication with the conversation group.

19. The mobile terminal of claim 14, wherein the second screen has a display function of displaying abbreviation information mapped to a specific contact information, and
wherein if at least one of the character pictures in the first screen and the abbreviation information in the second screen are selected, the controller is configured to perform the group communication with the contact information mapped to the selected at least one character picture and the abbreviation information.

20. A method of controlling a mobile terminal, the method comprising:
storing, in a memory of the mobile terminal, contact information respectively related to at least two character pictures included in an image;
displaying, on a touchscreen of the mobile terminal, the image;
when at least two character pictures are touched on the image, searching the memory for the contact information respectively related to the at least two character pictures touched on the image;
forming a conversation group with the searched contact information;
performing a group communication with the conversation group;
searching for messages transceived with counterpart terminals belonging to the conversation group via the group communication with the conversation group;
unifying the searched messages into a single file;
converting the single file to a file corresponding to a message type supported by each of the counterpart terminals belonging to the conversation group; and
transmitting the converted file to the counterpart terminals belonging to the conversation group.

* * * * *